United States Patent
Park

(10) Patent No.: US 10,985,615 B2
(45) Date of Patent: Apr. 20, 2021

(54) WIRELESS POWER CONTROL METHOD AND DEVICE FOR WIRELESS CHARGING

(71) Applicant: LG INNOTEK CO., LTD., Seoul (KR)

(72) Inventor: Jae Hee Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 265 days.

(21) Appl. No.: 16/312,802

(22) PCT Filed: Apr. 11, 2017

(86) PCT No.: PCT/KR2017/003927
§ 371 (c)(1),
(2) Date: Dec. 21, 2018

(87) PCT Pub. No.: WO2018/004117
PCT Pub. Date: Jan. 4, 2018

(65) Prior Publication Data
US 2019/0214852 A1 Jul. 11, 2019

(30) Foreign Application Priority Data

Jun. 28, 2016 (KR) .................. 10-2016-0080641
Jun. 30, 2016 (KR) .................. 10-2016-0082221

(51) Int. Cl.
| | | |
|---|---|---|
| H02J 50/12 | (2016.01) | |
| H02J 50/40 | (2016.01) | |
| H02J 7/02 | (2016.01) | |
| H02M 7/48 | (2007.01) | |
| H01F 27/28 | (2006.01) | |

(Continued)

(52) U.S. Cl.
CPC ............ H02J 50/12 (2016.02); H01F 27/288 (2013.01); H01F 38/14 (2013.01); H02J 7/02 (2013.01);

(Continued)

(58) Field of Classification Search
CPC .... H02J 50/12; H02J 7/02; H02J 50/80; H02J 50/90; H02J 50/70; H02J 7/025;

(Continued)

(56) References Cited

U.S. PATENT DOCUMENTS 9,735,628 B2 * 8/2017 Efe .................. H02J 50/12
9,742,216 B2 * 8/2017 Hur .................. H02J 50/12
(Continued)

FOREIGN PATENT DOCUMENTS

EP              3 145 047 A1    3/2017
KR     10-2010-0110356 A       10/2010
(Continued)

OTHER PUBLICATIONS

International Search Report (PCT/ISA/210) issued in PCT/KR2017/003927, dated Jul. 11, 2017.

*Primary Examiner* — Jared Fureman
*Assistant Examiner* — Michael J Warmflash
(74) *Attorney, Agent, or Firm* — Birch, Stewart, Kolasch & Birch, LLP

(57) ABSTRACT

The present invention relates to a wireless power control method and device for wireless charging, and the wireless power control method of a wireless power transmitter according to an embodiment of the present invention may comprise: a step of receiving, from a wireless power receiver, a first feedback signal requesting power control; a step of determining the intensity of a first transmission power on the basis of the first feedback signal; a step of determining an inverter type and a power control method which correspond to the determined intensity of the first transmission power; a step of activating an inverter corresponding to the determined inverter type; and a step of controlling the intensity of alternating current power outputted from the inverter, by using the determined power control method.

16 Claims, 25 Drawing Sheets

(51) Int. Cl.
*H02J 50/80* (2016.01)
*H02M 3/337* (2006.01)
*H02J 50/90* (2016.01)
*H01F 38/14* (2006.01)
*H02J 50/70* (2016.01)
*H02M 1/00* (2006.01)
*H02M 1/32* (2007.01)

(52) U.S. Cl.
CPC .............. *H02J 7/025* (2013.01); *H02J 50/40* (2016.02); *H02J 50/70* (2016.02); *H02J 50/80* (2016.02); *H02J 50/90* (2016.02); *H02M 3/337* (2013.01); *H02M 7/48* (2013.01); *H02M 1/32* (2013.01); *H02M 2001/0058* (2013.01); *H02M 2007/4818* (2013.01)

(58) Field of Classification Search
CPC ...... H02J 50/40; H02J 7/00712; H02M 3/337; H02M 7/48; H02M 2001/0058; H02M 1/32; H02M 2007/4818; H01F 38/14; H01F 27/288; Y02B 70/10
See application file for complete search history.

(56) References Cited

U.S. PATENT DOCUMENTS

| | | | |
|---|---|---|---|
| 10,243,406 B2 * | 3/2019 | Ushijima | H02J 50/12 |
| 2009/0174263 A1 | 7/2009 | Baarman et al. | |
| 2011/0115433 A1 * | 5/2011 | Lee | H02J 50/10 320/108 |
| 2012/0139358 A1 * | 6/2012 | Teggatz | H04B 5/0093 307/104 |
| 2014/0077613 A1 * | 3/2014 | Song | B60L 53/36 307/104 |
| 2015/0303706 A1 * | 10/2015 | Bronson | H01F 27/2804 307/104 |
| 2016/0121732 A1 * | 5/2016 | Matsumoto | B60L 53/126 307/10.1 |
| 2016/0248275 A1 * | 8/2016 | Okidan | H02J 5/005 |
| 2018/0254142 A1 * | 9/2018 | Jeong | H02J 50/12 |

FOREIGN PATENT DOCUMENTS

| | | |
|---|---|---|
| KR | 10-2011-0052972 A | 5/2011 |
| KR | 10-2012-0128099 A | 11/2012 |
| KR | 10-2013-0005571 A | 1/2013 |
| KR | 10-2014-0024194 A | 2/2014 |
| KR | 10-2014-0034982 A | 3/2014 |
| KR | 10-1485345 B1 | 1/2015 |
| KR | 10-2016-0007332 A | 1/2016 |
| KR | 10-2016-0042095 A | 4/2016 |
| WO | WO 2015/161053 A1 | 10/2015 |
| WO | WO 2015/173850 A1 | 11/2015 |

* cited by examiner

FIG. 10

| HEADER | PACKET TYPE | MESSAGE SIZE (BYTE) |
|---|---|---|
| 0x01 | Signal Strength | 1 |
| 0x02 | End Power Transfer | 1 |
| 0x06 | Power Control Hold-off | 1 |
| 0x51 | Configuration | 5 |
| 0x71 | Identification | 7 |
| 0x81 | Extended Identification | 8 |
| 0x07 | General Request | 1 |
| 0x20 | Specific Request | 2 |
| 0x22 | FOD Status | 2 |
| 0x03 | Control Error | 1 |
| 0x09 | Renegotiate | 1 |
| 0x31 | 24-bit Received Power | 3 |
| 0x04 | 8-bit Received Power | 1 |
| 0x05 | Charge Status | 1 |

WIRELESS POWER CONTROL METHOD AND DEVICE FOR WIRELESS CHARGING

CROSS REFERENCE TO RELATED APPLICATIONS

This application is the National Phase of PCT International Application No. PCT/KR2017/003927, filed on Apr. 11, 2017, which claims priority under 35 U.S.C. 119(a) to Patent Application No. 10-2016-0080641, filed in the Republic of Korea on Jun. 28, 2016 and to Patent Application No. 10-2016-0082221, filed in the Republic of Korea on Jun. 30, 2016, all of which are hereby expressly incorporated by reference into the present application.

TECHNICAL FIELD

Embodiments relate to a wireless power transmission technique, and more particularly, to a wireless power control method and device for wireless charging.

BACKGROUND ART

Recently, with rapid development of information and communication technology, a ubiquitous society based on information and communication technology is being established.

In order for information communication devices to be connected anywhere and anytime, sensors with a built-in computer chip having a communication function should be installed in all facilities throughout society. Accordingly, power supply to these devices or sensors is becoming a new challenge. In addition, as the types of mobile devices such as Bluetooth handsets and iPods, as well as mobile phones, rapidly increase in number, charging the battery has required time and effort. As a way to address this issue, wireless power transmission technology has recently drawn attention.

Wireless power transmission (or wireless energy transfer) is a technology for wirelessly transmitting electric energy from a transmitter to a receiver using the induction principle of a magnetic field. In the 1800s, an electric motor or a transformer based on the electromagnetic induction principle began to be used. Thereafter, a method of transmitting electric energy by radiating a high-frequency wave, microwave, or an electromagnetic wave such as laser was tried. Electric toothbrushes and some electric shavers are charged through electromagnetic induction.

Wireless energy transmission schemes introduced up to now may be broadly classified into electromagnetic induction, electromagnetic resonance, and RF transmission using a short-wavelength radio frequency.

In the electromagnetic induction scheme, when two coils are arranged adjacent to each other and current is applied to one of the coils, a magnetic flux generated at this time generates electromotive force in the other coil. This technology is being rapidly commercialized mainly for small devices such as mobile phones. In the electromagnetic induction scheme, power of up to several hundred kilowatts (kW) may be transmitted with high efficiency, but the maximum transmission distance is less than or equal to 1 cm. As a result, the device should be generally arranged adjacent to the charger or the floor.

The electromagnetic resonance scheme uses an electric field or a magnetic field instead of using an electromagnetic wave or current. The electromagnetic resonance scheme is advantageous in that the scheme is safe to other electronic devices or the human body since it is hardly influenced by the electromagnetic wave. However, this scheme may be used only at a limited distance and in a limited space, and has somewhat low energy transfer efficiency.

The short-wavelength wireless power transmission scheme (simply, RF transmission scheme) takes advantage of the fact that energy may be transmitted and received directly in the form of radio waves. This technology is an RF power transmission scheme using a rectenna. A rectenna, which is a compound of antenna and rectifier, refers to a device that converts RF power directly into direct current (DC) power. That is, the RF method is a technology for converting AC radio waves into DC waves. Recently, with improvement in efficiency, commercialization of RF technology has been actively researched.

The wireless power transmission technology is applicable to various industries including IT, railroads, and home appliance industries as well as the mobile industry.

As various devices are equipped with a wireless charging function and the intensity of power required by a wireless power reception device increases, heat generated in a drive circuit and a transmission coil may damage the devices.

In order to prevent heat generation, various heat dissipation structures including, for example, a heat dissipation fan and a heat dissipation material are installed in the wireless power transmission device and the wireless power reception device. However, not only does the heat dissipation effect of such structures fail to meet expectations, but it is also limited by cost and mechanism limitations.

In particular, while it is important to quickly dissipate generated heat, it is further important to minimize heat generated from a control circuit board and coils.

A wireless power transmitter may include a plurality of transmission coils. The wireless power transmitter may expand a charging area by using a plurality of transmission coils compared to a configuration using a single transmission coil.

The plurality of transmission coils included in the wireless power transmitter may be fabricated to have the same physical property. However, the coils may overlap each other depending on the arrangement of the transmission coils, and the inductance may vary depending on the distance from a shielding material, which affects the magnetic field generated in the transmission coils.

Therefore, there is a need for a method and device for utilizing the same resonance frequency in a plurality of transmission coils having different inductances while minimizing heat generated in the control circuit board and the coils.

DISCLOSURE

Technical Problem

Therefore, the present disclosure has been made in view of the above problems, and embodiments provide a wireless power control method and device for wireless charging.

Embodiments provide a wireless power control method and device for minimizing heat generation.

Embodiments provide a wireless power control method and device for adaptively determining an inverter type and a power control mode according to the intensity of transmission power.

Embodiments provide a method and device for controlling a wireless power transmitter including a plurality of transmission coils configured to have the same inductance and allowed to use the same resonance frequency using a switch in order to overcome the limitation of use of a plurality of transmission coils having different inductances, which requires a plurality of identical circuits.

The technical objects that can be achieved through the embodiments are not limited to what has been particularly described hereinabove and other technical objects not described herein will be more clearly understood by persons skilled in the art from the following detailed description.

Technical Solution

Embodiments provide a wireless power control method and a device therefor.

In one embodiment, a method of controlling a wireless power in a wireless power transmitter includes receiving a first feedback signal for requesting power control from a wireless power receiver, determining an intensity of a first transmission power based on the first feedback signal, determining an inverter type and a power control mode corresponding to the determined intensity of the first transmission power, activating an inverter corresponding to the determined inverter type, and adjusting an intensity of an alternating-current power output from the inverter using the determined power control mode.

The wireless power control method may further include receiving a second feedback signal for requesting power control from the wireless power receiver, determining an intensity of a second transmission power based on the second feedback signal, determining whether the determined intensity of the second transmission power is supportable through the activated inverter, and when the intensity is not supportable as a result of the determination, switching the inverter type.

The wireless power control method may further include when the intensity is supportable as a result of the determination, determining whether the power control mode needs to be changed based on the determined intensity of the second transmission power.

Here, the first and second feedback signals may be control error packets defined in a WPC standard.

In addition, the inverter type may include a half-bridge type and a full-bridge type.

The power control mode may include at least one of a duty cycle control mode, a driving frequency control mode, and a phase shift control mode.

In addition, when an inverter of the half-bridge type is activated, an intensity of an AC power output from the inverter may be adjusted using one of the duty cycle control mode and the operating frequency control mode.

In addition, when an inverter of the full-bridge type is activated, an intensity of an AC power output from the inverter may be adjusted using one of the phase shift control mode and the operating frequency control mode.

The wireless power control method may further include, when an operating frequency corresponding to the determined intensity of the transmission power is less than a predetermined operating frequency adjustment lower limit while the inverter of the full-bridge type is activated and the operating frequency control mode is determined as the power control mode, outputting a predetermined warning alarm indicating that a maximum transmission power has been reached.

A duty rate adjustment range in the duty cycle control mode according to an embodiment may be defined to be between a minimum of 10% and a maximum of 50%.

A phase adjustment range in the phase shift control mode according to one embodiment may be defined to be between 0 degrees and 133 degrees.

An operating frequency adjustment range in the operating frequency control mode according to an embodiment may be defined to be between 110 kHz and 205 kHz.

Here, the operating frequency adjustment range in the operating frequency control mode may be defined to be between 172 kHz and 205 kHz when the half-bridge type inverter is activated, and may be defined to be between 110 kHz and 172 kHz when the full-bridge type inverter is activated.

When the determined intensity of the second transmission power exceeds a predetermined first reference value during power control using the duty cycle control mode with the half-bridge type inverter activated, the power control mode may be switched to the operating frequency control mode.

When the determined intensity of the second transmission power exceeds a predetermined second reference value during power control using the phase shift control mode with the full-bridge type inverter activated, the power control mode may be switched to the operating frequency control mode.

In another embodiment, a device for controlling wireless power includes a DC-DC converter configured to convert an intensity of DC power supplied from a power source, a drive unit configured to convert the DC power supplied from the DC-DC converter into AC power using an inverter provided therein, a resonant circuit configured to wirelessly transmit the AC power supplied from the drive unit, and a control communication unit configured to adjust an intensity of the AC power output by the drive unit based on a feedback signal received through the resonant circuit, wherein the control communication unit determines an inverter type and a power control mode according to an intensity of transmission power determined based on the feedback signal to adjust the intensity of the AC power.

Here, the drive unit may include a first inverter of a half-bridge type, a second inverter of a full-bridge type, a switch for transmitting DC power supplied from the DC-DC converter to the first inverter or the second inverter, and an AC signal controller configured to control an intensity of AC power output from the first inverter or the second inverter according to a predetermined control signal of the control communication unit.

The AC signal controller may include an operating frequency generation unit configured to generate an AC signal having a specific operating frequency, and a duty cycle control unit configured to adjust an intensity of average transmission power applied to the resonant circuit by adjusting a duty rate of the AC signal, and a phase shift unit configured to adjust the intensity of the average transmission power applied to the resonant circuit by adjusting a phase of the AC signal.

In addition, the control communication unit may determine whether to switch at least one of the inverter type and the power control mode based on the determined intensity of the transmission power.

The feedback signal may be a control error packet defined in a WPC standard.

The inverter type may include a half-bridge type and a full-bridge type, and the power control mode may include at least one of a duty cycle control mode, an operating frequency control mode, and a phase shift control mode.

When the half-bridge type inverter is activated, the intensity of the AC power output from the inverter may be adjusted by using either the duty cycle control mode or the operating frequency control mode.

When an inverter of the half-bridge type is activated, an intensity of an AC power output from the inverter may be adjusted using one of the duty cycle control mode and the operating frequency control mode.

when an operating frequency corresponding to the determined intensity of the transmission power is less than a predetermined operating frequency adjustment lower limit while the inverter of the full-bridge type is activated and the operating frequency control mode is determined as the power control mode, the control communication unit may be controlled to output a predetermined warning alarm indicating that a maximum transmission power has been reached.

For example, a duty rate adjustment range in the duty cycle control mode may be defined to be between a minimum of 10% and a maximum of 50%.

For example, a phase adjustment range in the phase shift control mode may be defined to be between 0 degrees and 133 degrees.

For example, an operating frequency adjustment range in the operating frequency control mode may be defined to be between 110 kHz and 205 kHz. In this case, the operating frequency adjustment range in the operating frequency control mode may be defined to be between 172 kHz and 205 kHz when the half-bridge type inverter is activated, and may be defined to be between 110 kHz and 172 kHz when the full-bridge type inverter is activated.

When the determined intensity of the second transmission power exceeds a predetermined first reference value during power control using the duty cycle control mode with the half-bridge type inverter activated, the power control mode may be switched to the operating frequency control mode.

When the determined intensity of the second transmission power exceeds a predetermined second reference value during power control using the phase shift control mode with the full-bridge type inverter activated, the power control mode may be switched to the operating frequency control mode.

The method may also include, when an object is detected in a charging area, selecting a transmission coil having a highest power transmission efficiency among N transmission coils including at least one transmission coil arranged in an overlapping manner, and controlling a corresponding switch among N switches connecting the selected transmission coil and a drive circuit, wherein conductive wires constituting each of the N transmission coils are adjusted in length corresponding to respective positions thereof with respect to a shielding material so as to have the same inductance.

For example, the N transmission coils connected in parallel with each other may be corrected in series with the N switches, respectively, and are individually activated.

For example, the N transmission coils are connected in series with one capacitor.

For example, the N transmission coils may have the same inductance by forming a different number of turns corresponding to the respective positions with respect to the shielding member.

For example, each of the N transmission coils may have the different number of turns according to a distance thereof from the shielding member.

For example, the number of turns of each of the N transmission coils may be proportional to a distance from the shielding member.

For example, a difference in the number of turns between the N transmission coils may be 0.5 to 2 turns.

For example, the transmission coils may transmit power to a reception coil using a specific resonance frequency.

For example, the drive circuit may include an inverter configured to convert a direct current voltage from a power source into an alternating current voltage.

For example, the selected transmission coil may be connected in series between the drive circuit and the capacitor when one of the N switches is closed.

For example, the present disclosure may provide a computer-readable recording medium on which a program for executing the above-described method is recorded.

In another embodiment, a wireless power transmitter includes N transmission coils including at least one transmission coil arranged in an overlapping manner, N switches connecting the N transmission coils and a drive circuit, and a controller configured to, when an object is detected in a charging area, select a transmission coil having a highest power transmission efficiency among the N transmission coils and control a corresponding switch among the N switches connecting the selected transmission coil and the drive circuit, wherein conductive wires constituting each of the N transmission coils are adjusted in length according to respective positions thereof with respect to a shielding material so as to have the same inductance.

For example, the N transmission coils connected in parallel with each other may be corrected in series with the N switches, respectively, and are individually activated.

For example, the N transmission coils are connected in series with one capacitor.

For example, the N transmission coils may have the same inductance by forming a different number of turns corresponding to the respective positions with respect to the shielding member.

For example, each of the N transmission coils may have the different number of turns according to a distance thereof from the shielding member.

For example, the number of turns of each of the N transmission coils may be proportional to a distance from the shielding member.

For example, a difference in the number of turns between the N transmission coils may be 0.5 or 1 turns.

For example, the transmission coils may transmit power to a reception coil using a specific resonance frequency.

For example, the drive circuit may include an inverter configured to convert a direct current voltage from a power source into an alternating current voltage.

For example, the selected transmission coil may be connected in series between the drive circuit and the capacitor when one of the N switches is closed.

In another embodiment, there is provided a computer-readable recording medium having recorded thereon a program for executing any one of the above-mentioned wireless power control methods.

The above-described aspects of the present disclosure are merely a part of preferred embodiments of the present disclosure. Those skilled in the art will derive and understand various embodiments reflecting the technical features of the present disclosure from the following detailed description of the present disclosure.

Advantageous Effects

The method, device and system according to the embodiments have the following effects.

Embodiments provide a wireless power control method and device capable of preventing heat generation from occurring in a wireless power transmission device.

Embodiments provide a wireless power control method and device for adaptively determining an inverter type and a power control mode according to the intensity of transmission power.

According to embodiments, heat generation in a wireless power transmission device may be minimized without adding a separate hardware heat dissipation structure.

In addition, user convenience may be enhanced as a wider charging area is provided using a plurality of transmission coils.

In addition, as only one of a plurality of identical circuits needs to be used, the size of the wireless power transmitter may be reduced, and decrease in the number of parts used may lead to cost reduction.

Further, embodiments may use component devices defined in an established wireless power transmission standard, and may therefore conform to the defined standard.

It will be appreciated by those skilled in the art that that the effects that can be achieved through the embodiments of the present disclosure are not limited to those described above and other advantages of the present disclosure will be more clearly understood from the following detailed description.

DESCRIPTION OF DRAWINGS

FIG. 10 illustrates the types of packets defined in the WPC (Qi) standard according to an embodiment.

BEST MODE

Figure 1:
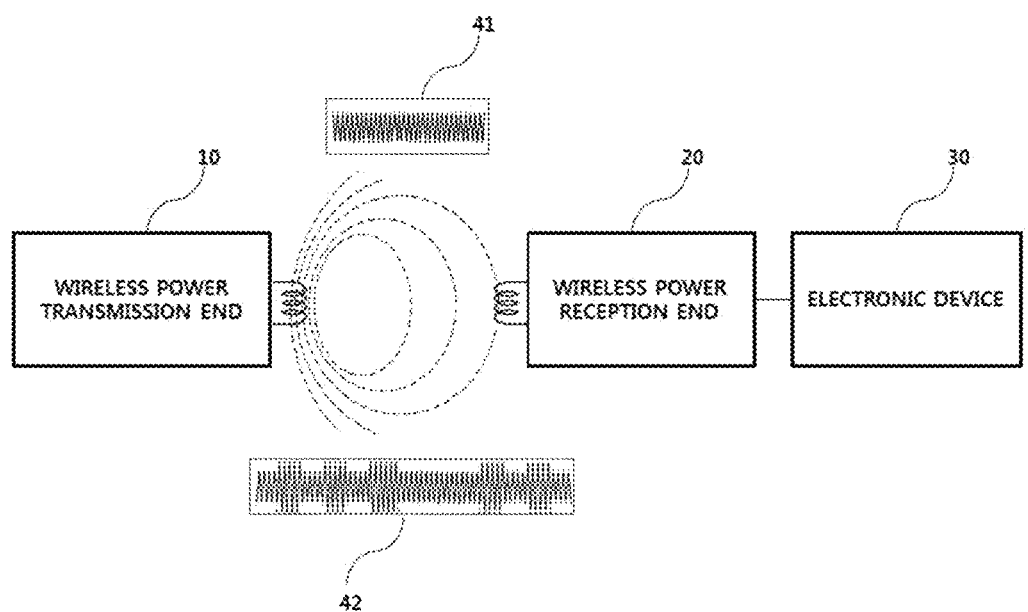
FIG. 1 is a block diagram illustrating a wireless charging system according to an embodiment.

A method of controlling wireless power in a wireless power transmitter according to an embodiment includes receiving a first feedback signal for requesting power control from a wireless power receiver, determining an intensity of a first transmission power based on the first feedback signal, determining an inverter type and a power control mode corresponding to the determined intensity of the first transmission power, activating an inverter corresponding to the determined inverter type, and adjusting an intensity of an alternating-current power output from the inverter using the determined power control mode.

MODE FOR INVENTION

Hereinafter, an apparatus and various methods to which embodiments of the present disclosure are applied will be described in detail with reference to the drawings. As used herein, the suffixes "module" and "unit" are added or used interchangeably to facilitate preparation of this specification and are not intended to suggest distinct meanings or functions.

In the description of the embodiments, it is to be understood that, when an element is described as being "on"/"over" or "beneath"/"under" another element, the two elements may directly contact each other or may be arranged with one or more intervening elements present therebetween. Also, the terms "on"/"over" or "beneath"/"under" may refer to not only an upward direction but also a downward direction with respect to one element.

For simplicity, in the description of the embodiments, "wireless power transmitter," "wireless power transmission device," "transmission end," "transmitter," "transmission device," "transmission side," "wireless power transfer device," "wireless power transferer," and the like will be used interchangeably to refer to a device equipped with a function of transmitting wireless power in a wireless charging system. In addition, "wireless power reception device," "wireless power receiver," "reception end," "reception side," "reception device," "receiver," and the like will be used interchangeably to refer to a device equipped with a function of receiving wireless power from a wireless power transmission device.

The transmitter according to the present disclosure may be configured as a pad type, a cradle type, an access point (AP) type, a small base station type, a stand type, a ceiling embedded type, a wall-mounted type, or the like. One transmitter may transmit power to a plurality of wireless power reception devices. To this end, the transmitter may include at least one wireless power transmission means. Here, the wireless power transmission means may employ various wireless power transmission standards which are based on the electromagnetic induction scheme for charging according to the electromagnetic induction principle meaning that a magnetic field is generated in a power transmission end coil and current is induced in a reception end coil by the magnetic field. Here, the wireless power transmission means may include wireless charging technology using electromagnetic induction schemes defined by the Wireless Power Consortium (WPC) and the Power Matters Alliance (PMA), which are wireless charging technology standard organizations.

In addition, a receiver according to an embodiment of the present disclosure may include at least one wireless power reception means, and may receive wireless power from two or more transmitters simultaneously. Here, the wireless power reception means may include wireless charging technologies of electromagnetic induction schemes defined by the Wireless Power Consortium (WPC) and the Power Matters Alliance (PMA), which are wireless charging technology standard organizations.

The receiver according to the present disclosure may be employed in small electronic devices including a mobile phone, a smartphone, a laptop computer, a digital broadcasting terminal, a Personal Digital Assistant (PDA), a Portable Multimedia Player (PMP), a navigation device, an electric toothbrush, an electronic tag, a lighting device, a remote control, a fishing float, and wearable devices such as a smart watch. However, the embodiments are not limited thereto. The applications may include any devices which are equipped with a wireless power transmission means and have a rechargeable battery.

FIG. 1 is a block diagram illustrating a wireless charging system according to an embodiment.

Referring to FIG. 1, the wireless charging system may include a wireless power transmission end 10 configure to wirelessly transmit power, a wireless power reception end 20 configure to receive the transmission power, and an electronic device 20 configured to be supplied with the received power.

In an example, the wireless power transmission end 10 and the wireless power reception end 20 may perform in-band communication, in which information is exchanged using the same frequency band as the operating frequency used for wireless power transmission. In another example, the wireless power transmission end 10 and the wireless power reception end 20 may perform out-of-band communication, in which information is exchanged using a separate frequency band different from the operating frequency used for wireless power transmission.

For example, the information exchanged between the wireless power transmission end 10 and the wireless power reception end 20 may include control information as well as state information about the terminals. Here, the state information and the control information exchanged between the transmission end and the reception end will be clarified through the embodiments which will be described later.

The in-band communication and the out-of-band communication may provide bidirectional communication, but embodiments are not limited thereto. In another embodiment, the in-band communication and the out-of-band communication may provide unidirectional communication or half-duplex communication.

For example, the unidirectional communication may be used for the wireless power reception end 20 to transmit information only to the wireless power transmission end 10, but embodiments are not limited thereto. The unidirectional communication may be used for the wireless power transmission end 10 to transmit information to the wireless power reception end 20.

In the half duplex communication, bidirectional communication may be performed between the wireless power reception end 20 and the wireless power transmission end 10, but only one device may be allowed to transmit information at a certain point of time.

The wireless power reception end 20 according to an embodiment may acquire various kinds of state information about an electronic device 30. For example, the state information about the electronic device 30 may include current power usage information, information for identifying an application being executed, CPU usage information, battery charging state information, and battery output voltage/current information, but embodiments are not limited thereto. The state information may include any information that may be acquired from the electronic device 30 and available for wireless power control.

In particular, the wireless power transmission end 10 according to an embodiment of the present disclosure may transmit, to the wireless power reception end 20, a predetermined packet indicating whether fast charging is supported. When it is determined that the connected wireless power transmission end 10 supports the fast charging mode, the wireless power reception end 20 may notify the electronic device 30 of the supportability. The electronic device 30 may indicate that fast charging is possible through a predetermined provided display means, for example, a liquid crystal display.

In addition, the user of the electronic device 30 may select a predetermined fast charging request button displayed on the liquid crystal display means to control the wireless power transmission end 10 to operate in the fast charging mode. In this case, when the fast charging request button is selected by the user, the electronic device 30 may transmit a predetermined fast charging request signal to the wireless power reception end 20. The wireless power reception end 20 may generate a charging mode packet corresponding to the received fast charging request signal and transmit the packet to the wireless power transmission end 10 so as to switch the general low power charging mode to the fast charging mode.

Figure 2:
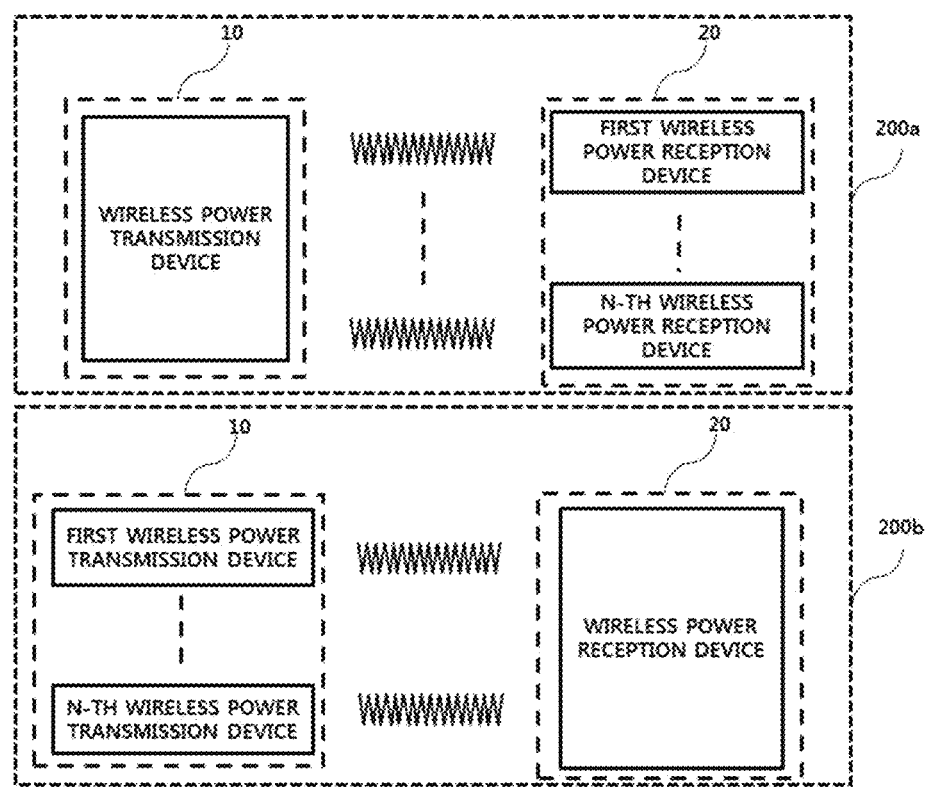
FIG. 2 is a block diagram illustrating a wireless charging system according to another embodiment.

FIG. 2 is a block diagram illustrating a wireless charging system according to another embodiment.

For example, as indicated by reference numeral 200a, the wireless power reception end 20 may include a plurality of wireless power receiving devices, and a plurality of wireless power reception devices may be connected to one wireless power transmission end 10 to perform wireless charging. In this operation, the wireless power transmission end 10 may distribute and transmit power to a plurality of wireless power reception devices in a time division manner, but embodiments are not limited thereto. In another example, the wireless power transmission end 10 distribute and transmit power to a plurality of wireless power reception devices using different frequency bands allocated to the respective wireless power reception devices.

Here, the number of wireless power reception devices connectable to one wireless power transmission device 10 may be adaptively determined based on at least one of a required power for each wireless power reception device, a battery charging state, a power consumption amount of the electronic device, and an available power of the wireless power transmission device.

As another example, as indicated by reference numeral 200b, the wireless power transmission end 10 may include a plurality of wireless power transmission devices. In this case, the wireless power reception end 20 may be connected to a plurality of wireless power transmission devices simultaneously, and may receive power from the connected wireless power transmission devices simultaneously to perform charging. Here, the number of wireless power transmission devices connected to the wireless power reception end 20 may be adaptively determined based on a required power of the wireless power reception end 20, a battery charging state, a power consumption amount of the electronic device, an available power of the wireless power transmission device, and the like.

Figure 3:
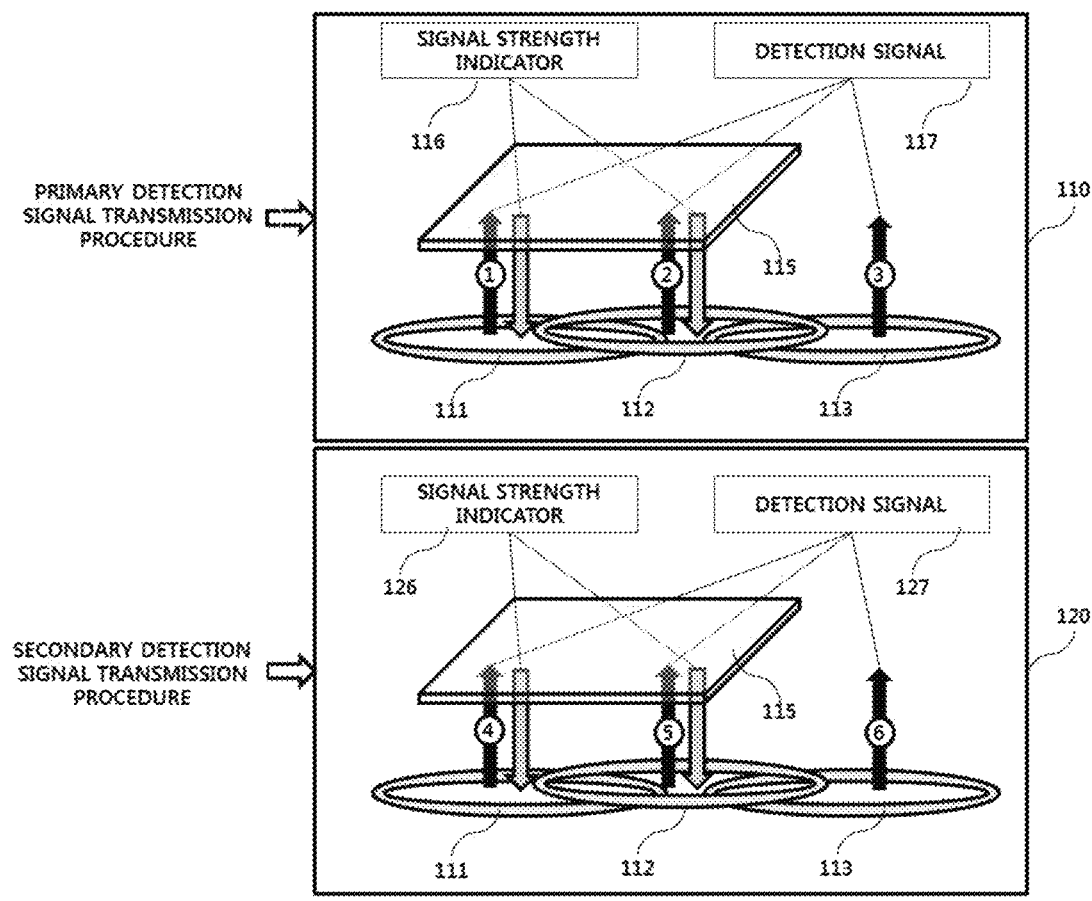
FIG. 3 is a diagram illustrating a detection signal transmission procedure in a wireless charging system according to an embodiment.

FIG. 3 is a diagram illustrating a procedure of transmitting a detection signal in a wireless charging system according to an embodiment.

As an example, the wireless power transmitter may be equipped with three transmission coils 111, 112, and 113. Each transmission coil may have a region partially overlapping the other transmission coils, and the wireless power transmitter sequentially transmits predetermined detection signals 117 and 127, for example, digital ping signals, for detecting presence of a wireless power receiver through the respective transmission coils in a predefined order.

As shown in FIG. 3, the wireless power transmitter may sequentially transmit detection signals 117 through a primary detection signal transmission procedure, which is indicated by reference numeral 110, and identify transmission coils 111 and 112 through which a signal strength indicator 116 is received from the wireless power receiver 115. Subsequently, the wireless power transmitter may sequentially transmit detection signals 127 through a secondary detection signal transmission procedure, which is indicated by reference numeral 120, identify a transmission coil exhibiting better power transmission efficiency (or charging efficiency), namely better alignment between the transmission coil and the reception coil, between the transmission coils 111 and 112 through which the signal strength indicator 126 is received, and perform a control operation to transmit power through the identified transmission coil, that is, to perform wireless charging.

The wireless power transmitter performs the detection signal transmission procedure twice as shown in FIG. 3 to more accurately identify a transmission coil that is better aligned with the reception coil of the wireless power receiver.

When the signal strength indicators 116 and 126 are received by the first transmission coil 111 and the second transmission coil 112 as indicated by reference numerals 110 and 120 of FIG. 3, the wireless power transmitter selects a transmission coil exhibiting the best alignment based on the signal strength indicator 126 received by each of the first transmission coil 111 and the second transmission coil 112 and performs wireless charging using the selected transmission coil.

Figure 4:
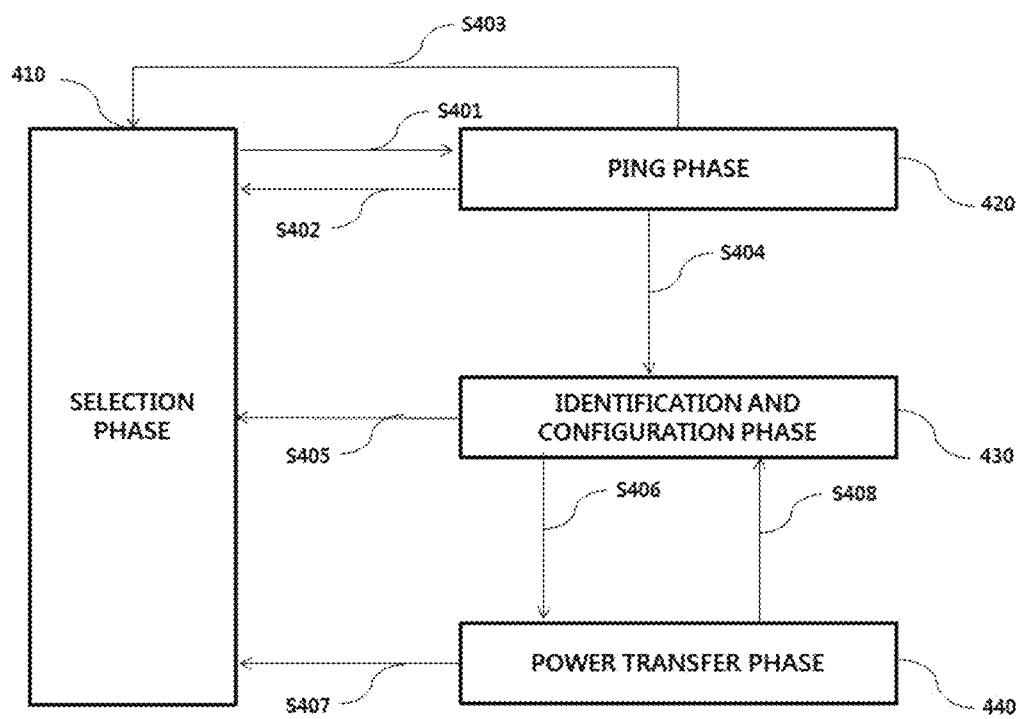
FIG. 4 is a state transition diagram illustrating a wireless power transmission procedure defined in the WPC standard.

FIG. 4 is a state transition diagram illustrating a wireless power transmission procedure defined in the WPC standard.

Referring to FIG. 4, power transmission from a transmitter to a receiver according to the WPC standard is broadly divided into a selection phase 410, a ping phase 420, an identification and configuration phase 430, and a power transfer phase 440.

The selection phase 410 may be a phase which transitions when a specific error or a specific event is detected while power transmission begins or is maintained. Here, the specific error and the specific event will be clarified through the following description. Further, in the selection phase 410, the transmitter may monitor whether an object is present at the interface surface. When the transmitter detects an object being placed on the interface surface, it may transition to the ping phase 420 (S401). In the selection phase 410, the transmitter may transmit an analog ping signal of a very short pulse and detect whether an object is present in the active area of the interface surface based on the change in current of the transmission coils.

When the transmitter detects an object in the ping phase 420, it activates the receiver and transmits a digital ping to identify whether the receiver is a WPC standard-compatible receiver. In a case where the transmitter does not receive a response signal (e.g., a signal strength indicator) for the digital ping from the receiver in the ping phase 420, it may transition back to the selection phase 410 (S402). In addition, if the transmitter receives, from the receiver, a signal indicating completion of power transmission, that is, a charge completion signal in the ping phase 420, the transmitter may transition to the selection phase 410 (S403).

Once the ping phase 420 is complete, the transmitter may transition to the identification and configuration phase 430 for identifying the receiver and collecting configuration and state information about the receiver (S404).

In the identification and configuration phase 430, when an unexpected packet is received (unexpected packet), a desired packet is not received for a predefined time (timeout), there is an error in packet transmission (transmission error) or no power transfer contract is made (no power transfer contract), the transmitter may transition to the selection phase 410 (S405).

Once identification and configuration of the receiver are complete, the transmitter may transition to the power transfer phase for transmitting wireless power (S406).

In the power transfer phase 440, when an unexpected packet is received (unexpected packet), a desired packet is not received for a predefined time (timeout), a violation of a pre-established power transmission contract occurs (power transfer contract violation), and charging is complete, the transmitter may transition to the selection phase 410 (S407).

In addition, in the power transfer phase 440, when the power transfer contract needs to be reconfigured according to change in the state of the transmitter or the like, the transmitter may transition to the identification and configuration phase 430 (S408).

The above-described power transmission contract may be set based on the state and characteristics information about the transmitter and the receiver. For example, the transmitter state information may include information on a maximum amount of transmittable power and information on a maximum number of acceptable receivers, and the receiver state information may include information on the required power.

Figure 5:
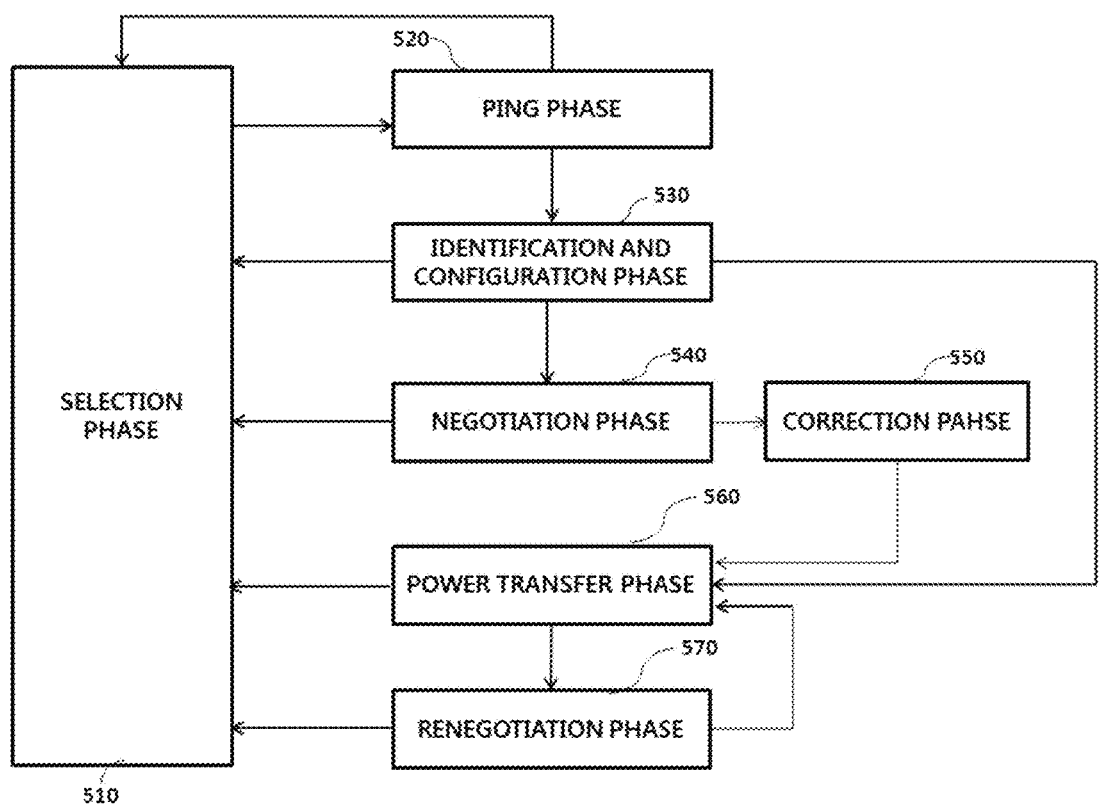
FIG. 5 is a state transition diagram illustrating a wireless power transmission procedure defined in the WPC (Qi) standard.

FIG. 5 is a state transition diagram illustrating a wireless power transmission procedure defined in the WPC (Qi) standard.

Referring to FIG. 5, power transmission from a transmitter to a receiver according to the WPC (Qi) standard may be broadly divided into a selection phase 510, a ping phase 520, an identification and configuration phase, 530, a negotiation phase 540, a calibration phase 550, a power transfer phase 560, and a renegotiation phase 570.

The selection phase 510 may be a phase which transitions to another phase (e.g., S502, S504, S506, S509), when a specific error or a specific event is detected while power transmission begins or is maintained. Here, the specific error and the specific event will be clarified through the following description. Further, in the selection phase 510, the transmitter may monitor whether an object is present at the interface surface. When the transmitter detects an object being placed on the interface surface, it may transition to the ping phase 520. In the selection phase 510, the transmitter may transmit an analog ping signal of a very short pulse and detect whether an object is present in the active area of the interface surface based on the change in current of the transmission coil or the primary coil.

When the transmitter detects an object in the ping phase 520, it activates the receiver and transmits a digital ping to identify whether the receiver is a WPC standard-compatible receiver. In a case where the transmitter does not receive a response signal (e.g., a signal strength packet) for the digital ping from the receiver in the ping phase 520, it may transition back to the selection phase 510. In addition, when the transmitter receives, from the receiver, a signal indicating completion of power transmission, that is, a charge completion packet in the ping phase 520, the transmitter may transition to the selection phase 510.

Once the ping phase 520 is complete, the transmitter may transition to the identification and configuration phase 530 for identifying the receiver and collecting configuration and state information about the receiver.

In the identification and configuration phase 530, when an unexpected packet is received (unexpected packet), a desired packet is not received for a predefined time (timeout), there is an error in packet transmission (transmission error) or no power transfer contract is made (no power transfer contract), the transmitter may transition to the selection phase 510.

The transmitter may check whether an entry to the negotiation phase 540 is necessary based on the value of the negotiation field in the configuration packet received in the identification and configuration phase 530.

When a negotiation is needed as a result of checking, the transmitter may enter negotiation phase 540 and perform a predetermined FOD procedure.

On the other hand, when a negotiation is not needed as a result of checking, the transmitter may immediately enter the power transfer phase 560.

In the negotiation phase 540, the transmitter may receive a foreign object detection (FOD) status packet including a value of a reference quality factor. Then, the transmitter may determine a threshold for FO detection based on the value of the reference quality factor.

The transmitter may detect whether an FO is present in the charging area using the determined threshold for FO detection and the currently measured quality factor value, and control power transmission according to the FO detection result. In one example, when an FO is detected, power transmission may be interrupted, but embodiments are not limited thereto.

When an FO is detected, the transmitter may return to the selection phase 510. On the other hand, when no FO is detected, the transmitter may enter the power transfer phase 560 via the calibration phase 550. Specifically, when no FO is detected, the transmitter may determine, in the calibration phase 550, the intensity of power received by the reception end, and measure power loss at the reception end and the transmission end to determine the intensity of power transmitted from the transmission end. That is, in the calibration phase 550, the transmitter may predict power loss based on the difference between the transmission power of the transmission end and the received power of the reception end. According to an embodiment, the transmitter may calibrate the threshold for FOD in consideration of the predicted power loss.

In the power transfer phase 540, when an unexpected packet is received (unexpected packet), a desired packet is not received for a predefined time (timeout), a violation of a pre-established power transmission contract occurs (power transfer contract violation), and charging is complete, the transmitter may transition to the selection phase 510.

In addition, in the power transfer phase 440, when the power transfer contract needs to be reconfigured according to change in the state of the transmitter or the like, the transmitter may transition to the renegotiation phase 570. In this case, when the renegotiation is normally completed, the transmitter may return to the power transfer phase 560.

The above-described power transmission contract may be set based on the state and characteristics information about the transmitter and the receiver. For example, the transmitter state information may include information on a maximum amount of transmittable power and information on a maximum number of acceptable receivers, and the receiver state information may include information on the required power.

Figure 6:
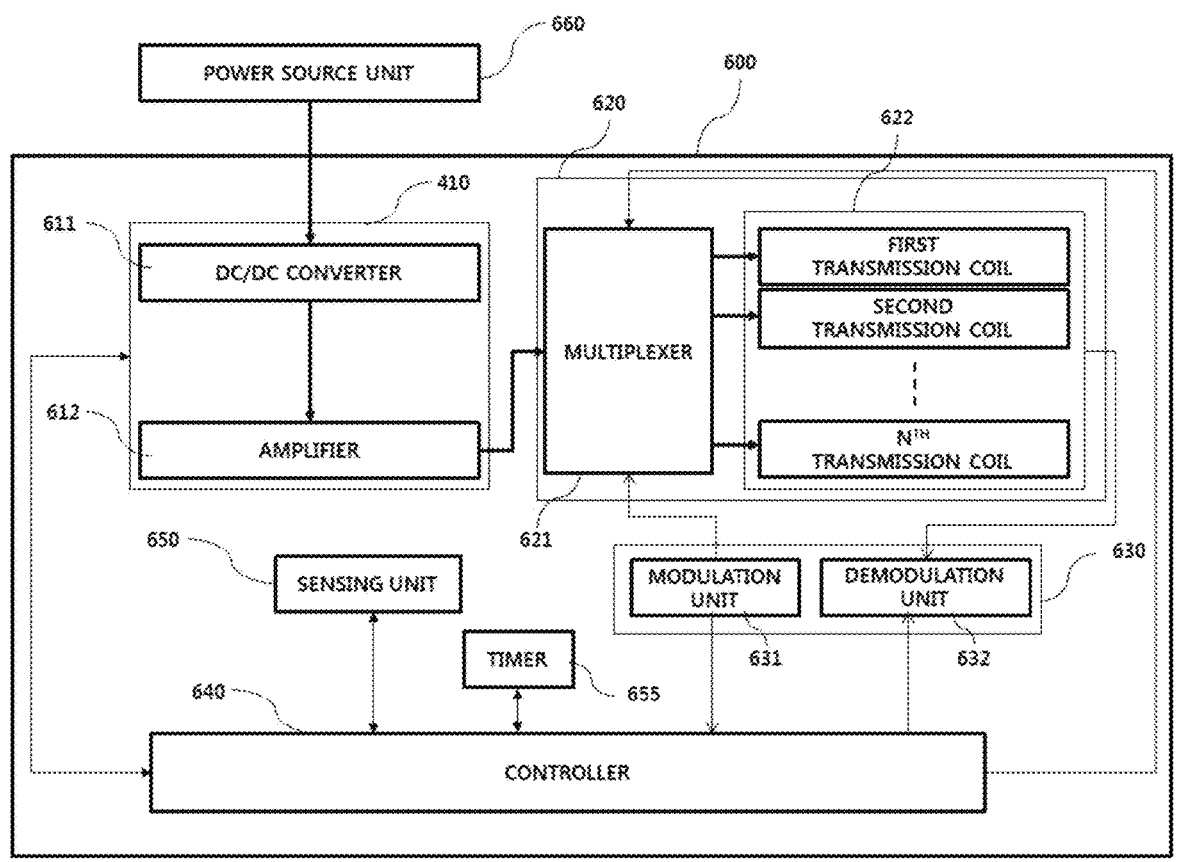
FIG. 6 is a block diagram illustrating a structure of a wireless power transmitter according to an embodiment.

FIG. 6 is a block diagram illustrating a structure of a wireless power transmitter according to an embodiment.

Referring to FIG. 6, the wireless power transmitter 600 may include a power conversion unit 610, a power transmission unit 620, a communication unit 630, a controller 640, and a sensing unit 650. It should be noted that the elements of the wireless power transmitter 600 described above are not necessarily essential elements, and thus the wireless power transmitter may be configured to include more or fewer elements.

As shown in FIG. 6, when DC power is supplied from a power source unit 660, the power conversion unit 610 may function to convert the power into AC power having a predetermined intensity.

To this end, the power conversion unit 610 may include a DC/DC converter 611, and an amplifier 612.

The DC/DC converter 611 may function to convert DC power supplied from the power source unit 650 into DC power having a specific intensity according to a control signal of the controller 640.

Then, the sensing unit 650 may measure the voltage/current of the DC-converted power and provide the measured voltage/current to the controller 640. In addition, the sensing unit 650 may measure the internal temperature of the wireless power transmitter 600 and provide the measurement result to the controller 640 in order to determine whether overheating occurs. For example, the controller 640 may adaptively cut off power supplied from the power source unit 650 or cut off power supplied to the amplifier 612, based on the voltage/current value measured by the sensing unit 650. To this end, a predetermined power cutoff circuit may be further provided on one side of the power conversion unit 610 to cut off power supplied from the power source unit 650 or to cut off power supplied to the amplifier 612.

The amplifier 612 may amplify the intensity of the DC/DC-converted power to a predetermined intensity according to a control signal of the controller 640. For example, the controller 640 may receive power reception state information about the wireless power receiver and/or a power control signal through the communication unit 630 and may dynamically adjust the amplification factor of the amplifier 612 based on the received power reception state information and/or power control signal. For example, the power reception state information may include, but is not limited to, intensity information about the rectifier output voltage and intensity information about the current applied to the reception coil. The power control signal may include a signal for requesting increase of power and a signal for requesting decrease of power.

The power transmission unit 620 may include a multiplexer 621 and a transmitting coil 622. The power transmission unit 620 may further include a carrier generator (not shown) configured to generate a specific operating frequency for power transmission.

The carrier generator may generate a specific frequency for converting the output DC power of the amplifier 612 received through the multiplexer 621 to AC power having a specific frequency. While it has been described that the AC signal generated by the carrier generator is mixed at the output end of the multiplexer 621 to generate AC power, this is merely one embodiment. In another example, it is to be noted that the generated signal may be mixed with a specific operating frequency at a stage before or after the amplifier 612 to generate an AC power signal.

It should be noted that the frequencies of the AC power delivered to the respective transmission coils according to an embodiment may be different from each other. In another embodiment of the present disclosure, the resonance frequency may be set differently for each transmission coil using a predetermined frequency controller having a function of adjusting the LC resonance characteristics differently for the respective transmission coils.

As shown in FIG. 6, the power transmission unit 620 may include a multiplexer 621 for controlling transmission of the output power of the amplifier 612 to transmission coils, and a plurality of transmission coils 622, i.e., first to n-th transmission coils.

When a plurality of wireless power receivers are connected, the controller 640 according to an embodiment of the present disclosure may transmit power by time division multiplexing for each transmission coil. For example, when three wireless power receivers, i.e., first to third wireless power receivers, are each identified through three different transmission coils, i.e., first to third transmission coils, in the wireless power transmitter 600, the controller 640 may control the multiplexer 621 such that power may be transmitted through a specific transmission coil in a specific time slot. Here, the amount of power to be transmitted to the corresponding wireless power receiver may be controlled according to the length of the time slot allocated to each transmission coil, but this is merely one embodiment. In another embodiment, the amplification factor of the amplifier 612 may be controlled during the time slot allocated to each transmission coil to control the transmit power for each wireless power receiver.

The controller 640 may control the multiplexer 621 so as to sequentially transmit the detection signals through the first to n-th transmission coils 622 during the primary detection signal transmission procedure. In this case, the controller 640 may identify, through the timer 655, a time to transmit a detection signal. When the time reaches the detection signal transmission time comes, the controller 640 may control the multiplexer 621 to transmit the detection signals through the corresponding transmission coils. For example, the timer 650 may transmit a specific event signal to the controller 640 at predetermined intervals during the ping transmission phase. When the event signal is detected, the controller 640 may control the multiplexer 621 so as to transmit the digital ping through the corresponding transmission coil.

In addition, during the primary detection signal transmission procedure, the controller 640 may receive a predetermined transmission coil identifier for identifying a transmission coil through which a signal strength indicator has been received from the demodulation unit 632 and the signal strength indicator received through the corresponding transmission coil. Subsequently, in the secondary detection signal transmission procedure, the controller 640 may control the multiplexer 621 such that the detection signal may be transmitted only through the transmission coil(s) through which the signal strength indicator has been received during the primary detection signal transmission procedure. In another example, when there is a plurality of transmission coils through which the signal strength indicators have been received during the first differential detection signal transmission procedure, the controller 640 may determine a transmission coil through which a signal strength indicator having the greatest value has been received as a transmission coil to be used first to transmit a detection signal in the secondary detection signal transmission procedure, and control the multiplexer 621 according to the result of the determination.

The communication unit 630 may include at least one of a modulation unit 631 and a demodulation unit 632.

The modulation unit 631 may modulate the control signal generated by the controller 640 and transfer the modulated control signal to the multiplexer 621. Here, the modulation schemes for modulating the control signal may include, but is not limited to, frequency shift keying (FSK), Manchester coding, phase shift keying (PSK), pulse width modulation, and differential bi-phase modulation.

When a signal received through a transmission coil is detected, the demodulation unit 632 may demodulate the detected signal and transmit the demodulated signal to the controller 640. Here, the demodulated signal may include a signal strength indicator, an error correction (EC) indicator for power control during wireless power transmission, an EOC (end of charge) indicator, and an overvoltage/overcurrent/overheat indicator, but embodiments are not limited thereto. The demodulated signal may include various kinds of state information for identifying the state of the wireless power receiver.

In addition, the demodulation unit 632 may identify a transmission coil through which the demodulated signal has been received, and provide the controller 640 with a predetermined transmit coil identifier corresponding to the identified transmission coil.

The demodulation unit 632 may also demodulate the signal received through the transmission coil 623 and transmit the demodulated signal to the controller 640. In one example, the demodulated signal may include, but is not limited to, a signal strength indicator. The demodulated signal may include various kinds of state information about the wireless power receiver.

In one example, the wireless power transmitter 600 may acquire the signal strength indicator through in-band communication that uses the same frequency as used for wireless power transmission to communicate with the wireless power receiver.

In addition, the wireless power transmitter 600 may not only transmit wireless power using the transmission coil 622, but also exchange various kinds of information with the wireless power receiver through the transmission coil 622. In another example, it should be noted that the wireless power transmitter 600 may further include separate coils corresponding to each of the transmission coils 622, i.e., the first to n-th transmission coils, and perform in-band communications with the wireless power receiver using the separate coils.

Although FIG. 6 illustrates that the wireless power transmitter 600 and the wireless power receiver perform in-band communication, this is merely an example. The transmitter and the receiver may perform short-range bidirectional communication through a frequency band different from the frequency band used for transmission of wireless power signals. For example, the short-range bidirectional communication may be any one of low-power Bluetooth communication, RFID communication, UWB communication, and ZigBee communication.

Figure 7:
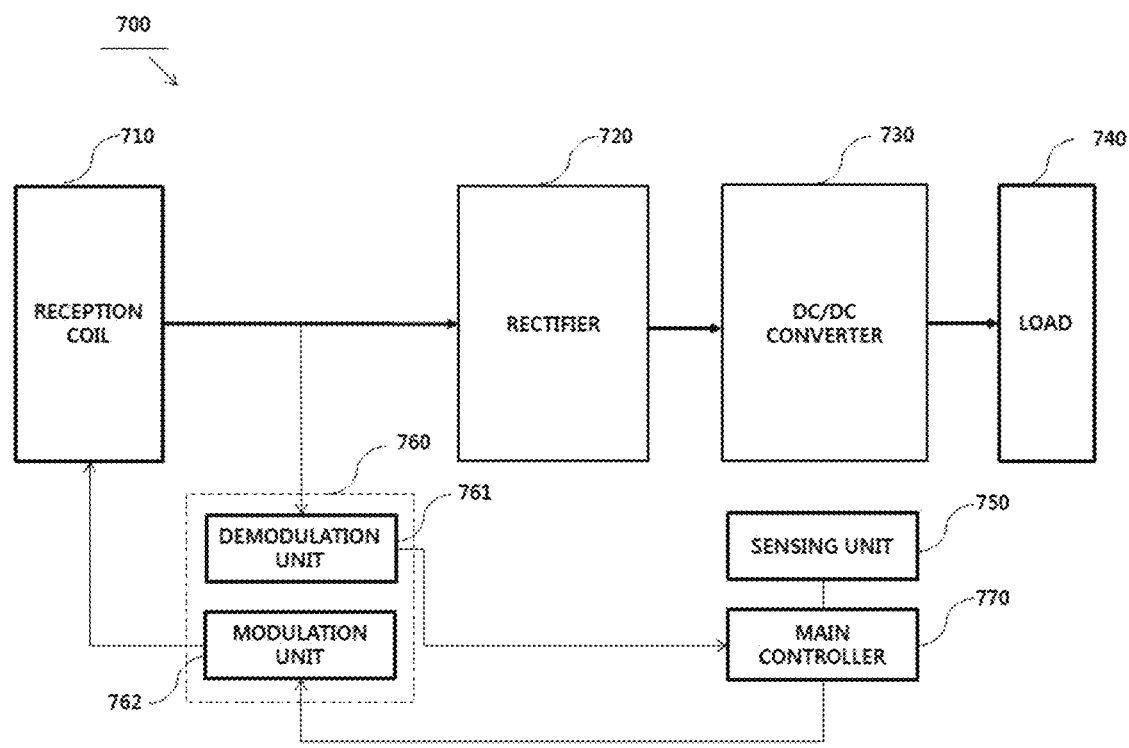
FIG. 7 is a block diagram illustrating a structure of a wireless power receiver operatively connected with the wireless power transmitter according to the FIG. 6.

FIG. 7 is a block diagram illustrating a structure of a wireless power receiver operatively connected with the wireless power transmitter according to the FIG. 6.

Referring to FIG. 7, the wireless power receiver 700 may include a reception coil 710, a rectifier 720, a DC/DC converter 730, a load 740, a sensing unit 750, a communication unit 760, and a main controller 770. Here, the communication unit 760 may include at least one of a demodulation unit 761 and a modulation unit 762.

Although the wireless power receiver 700 is illustrated in FIG. 7 as being capable of exchanging information with the wireless power transmitter 600 through in-band communication, this is merely an embodiment. According to another embodiment of the present disclosure, the communication unit 760 may provide short-range bidirectional communication through a frequency band different from the frequency band used for transmission of wireless power signals.

The AC power received via the reception coil 710 may be transferred to the rectifier 720. The rectifier 720 may convert the AC power to DC power and transmit the DC power to the DC/DC converter 730. The DC/DC converter 730 may convert the intensity of the rectifier output DC power to a specific intensity required by the load 740 and then deliver the converted power to the load 740.

The sensing unit 750 may measure the intensity of the DC power output from the rectifier 720 and may provide the measured DC power to the main controller 770. In addition, the sensing unit 750 may measure the intensity of the current applied to the reception coil 710 according to the wireless power reception, and may transmit the measurement result to the main controller 770. Further, the sensing unit 750 may measure the internal temperature of the wireless power receiver 700 and provide the measured temperature to the main controller 770.

For example, the main controller 770 may compare the intensity of the measured rectifier output DC power with a predetermined reference value to determine whether an overvoltage is generated. When an overvoltage has been generated as a result of the determination, the main controller may generate a predetermined packet indicating that an overvoltage has occurred and transmit the packet to the modulation unit 762. Here, the signal modulated by the modulation unit 762 may be transmitted to the wireless power transmitter 600 through the reception coil 710 or a separate coil (not shown). Further, when the intensity of the rectifier output DC power is greater than or equal to a predetermined reference value, the main controller 770 may determine that the detection signal has been received. When the detection signal is received, the main controller may control the signal strength indicator corresponding to the detection signal to be transmitted to the wireless power transmitter 600 through the modulation unit 762. In another example, the demodulation unit 761 may demodulate an AC power signal between the reception coil 710 and the rectifier 720 or a DC power signal output from the rectifier 720 to identify whether or not the detection signal has been received, and then provide the result of the identification to the main controller 770. Then, the main controller 770 may control a signal strength indicator corresponding to the detection signal to be transmitted through the modulation unit 762.

Figure 8:
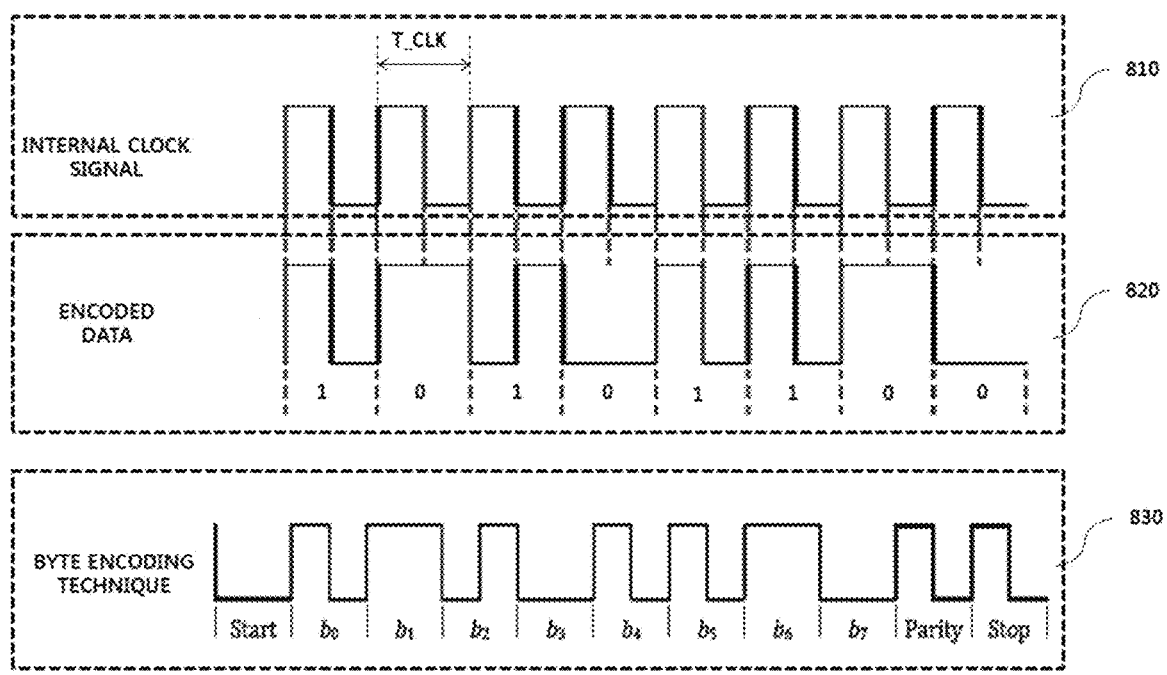
FIG. 8 is a diagram illustrating a method of modulation and demodulation of a wireless power signal according to an embodiment.

FIG. 8 is a diagram illustrating a method of modulation and demodulation of a wireless power signal according to an embodiment.

As shown in a section indicated by reference numeral 810 in FIG. 8, the wireless power transmission end 10 and the wireless power reception end 20 may encode or decode a packet to be transmitted based on an internal clock signal having the same periodicity.

Hereinafter, a method of encoding a packet to be transmitted will be described in detail with reference to FIGS. 1 to 8.

Referring to FIG. 1, when the wireless power transmission end 10 or the wireless power reception end 20 does not transmit a specific packet, the wireless power signal may be an alternating current signal of a specific frequency that is not modulated, as shown in the section indicated by reference numeral 41 in FIG. 1. On the other hand, when the wireless power transmission end 10 or the wireless power reception end 20 transmits the specific packet, the wireless power signal may be an AC signal modulated in a specific modulation scheme, as shown in the section indicated by reference numeral 42 in FIG. 1. For example, the modulation scheme may include, but is not limited to, an amplitude modulation scheme, a frequency modulation scheme, a frequency and amplitude modulation scheme, and a phase modulation scheme.

The binary data of the packet generated by the wireless power transmission end 10 or the wireless power reception end 20 may be subjected to differential bi-phase encoding as shown in the section indicated by reference numeral 820. Specifically, the differential bi-stage encoding undergoes two state transitions to encode data bit 1 and undergoes one state transition to encode data bit 0. That is, the data bit 1 may be encoded such that transition between state HI and state LO occurs at the rising edge and the falling edge of the clock signal, and data bit 0 may be encoded such that transition between state HI and state LO occurs at HI at the rising edge of the clock signal.

A byte encoding technique may be applied to the encoded binary data, as shown in the section indicated by reference numeral 830. Referring to the section indicated by reference numeral 830, a byte encoding technique according to an embodiment of the present disclosure may be a technique of inserting a start bit and a stop bit for identifying start and stop of a 8-bit encoded binary bitstream and a parity bit for detecting whether an error has occurred in the bitstream (in byte).

Figure 9:
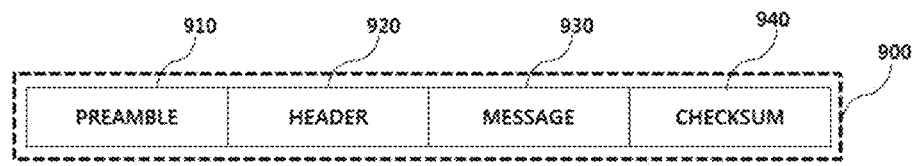
FIG. 9 illustrates a packet format according to an embodiment.

FIG. 9 illustrates a packet format according to an embodiment.

Referring to FIG. 9, a packet format 900 used for information exchange between the wireless power transmission end 10 and the wireless power reception end 20 may include a preamble field 910 for acquiring synchronization for demodulation of the packet and identifying an accurate start bit of the packet, a header field 920 for identifying the type of a message included in the packet, a message field 930 for transmitting the content of the packet (or a payload), and a checksum field 940 for checking whether an error has occurred in the packet.

The packet reception end may identify the size of the message 930 included in the packet based on the value of the header 920.

In addition, the header 920 may be defined for each phase of the wireless power transmission procedure. The same value of the header 920 may be defined in different phases. For example, referring to FIG. 10, it should be noted that the header value corresponding to the End Power Transfer in the ping phase and the header value corresponding to the End Power Transfer in the power transfer phase may all be 0x02.

The message 930 includes data to be transmitted at the transmitting end of the packet. For example, the data contained in the message field 930 may be, but is not limited to, a report, a request, or a response to the other party.

According to another embodiment of the present disclosure, the packet 900 may further include at least one of transmission end identification information for identifying a transmission end that transmits the packet and reception end identifying information for identifying a reception end to receive the packet. Here, the transmission end identification information and the reception end identification information may include, but is not limited to, IP address information, MAC address information, and product identification information, and the like. They may include any information for distinguishing between the reception end and the transmission end in the wireless charging system.

According to still another embodiment of the present disclosure, the packet 900 may further include predetermined group identification information for identifying a reception group when the packet is to be received by a plurality of devices.

FIG. 10 illustrates the types of packets transmitted from a wireless power receiver to a wireless power transmitter according to an embodiment of the present disclosure.

Referring to FIG. 10, packets transmitted from a wireless power receiver to a wireless power transmitter may include a signal strength packet for transmitting strength information about a detected ping signal, an end power transfer packet for requesting the transmission end to stop power transmission, a power control hold-off packet for transmitting time for waiting until power is actually adjusted after receiving a control error packet for control, a configuration packet for transmitting the configuration information about the receiver, an identification packet and an extended identification packet for transmitting identification information about the receiver, a general request packet for transmitting a general request message, a specific request packet for transmitting a specific request message, an FOD status packet for transmitting a reference quality factor value for FO detection, a control error packet for controlling the transmission power of the transmitter, a renegotiation packet for starting renegotiation, a 24-bit received power packet and an 8-bit received power packet for transmitting intensity information about the received power, and a charge status packet for transmitting charge status information about a current load.

The packets to be transmitted from the wireless power receiver to the wireless power transmitter may be transmitted through in-band communication using the same frequency band as that used for wireless power transmission.

Figure 11:
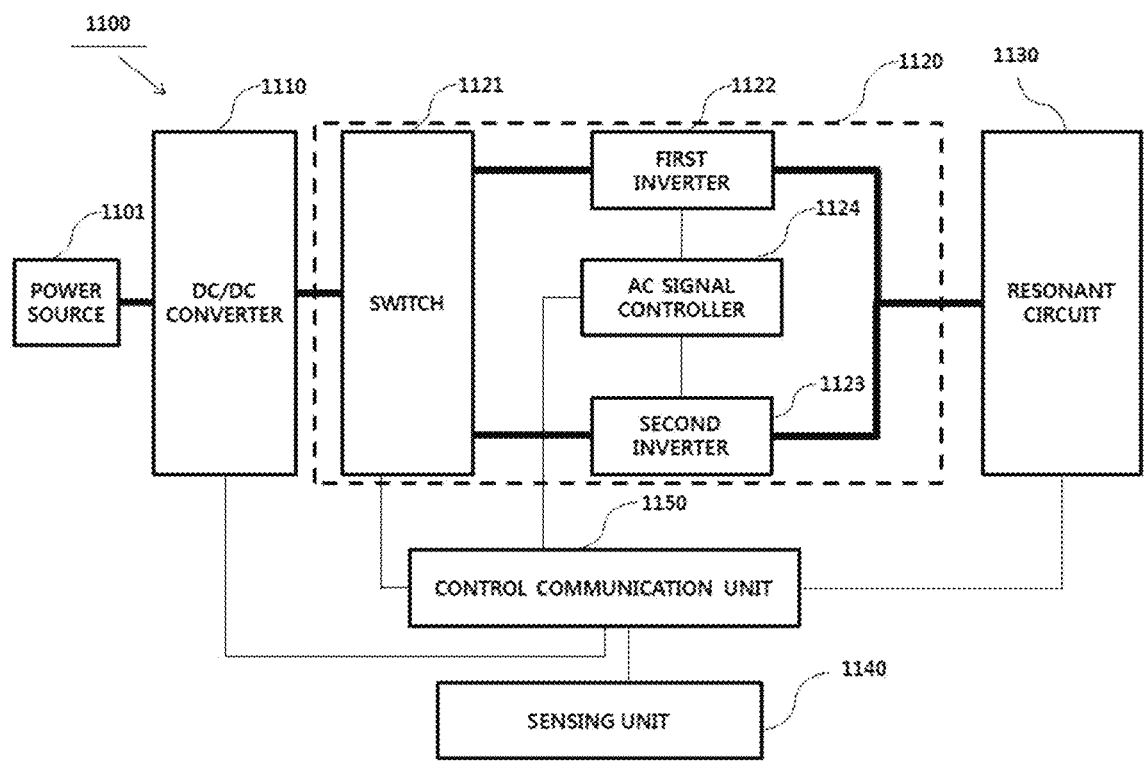
FIG. 11 is a block diagram illustrating a structure of a wireless power control device according to an embodiment.

FIG. 11 is a block diagram illustrating a structure of a wireless power control device according to an embodiment.

As an example, the wireless power control device may be mounted in a wireless power transmitter.

Referring to FIG. 11, the wireless power control device 1100 may include a power source unit 1101, a DC-DC converter 1110, a drive unit 1120, a resonant circuit 1130, a sensing unit 1140, and a control communication unit 1150.

The power source unit 1101 may be supplied with DC power through an external power terminal and transmit the DC power to the DC-DC converter 1110.

The DC-DC converter 1110 may convert the intensity of the DC power received from the power source unit 1101 into DC power having a specific intensity. For example, the DC-DC converter 1110 may include a variable transformer capable of controlling the magnitude of the voltage, and may control the intensity of the output DC power according to a predetermined control signal of the control communication unit 1150. However, embodiments are not limited thereto.

The drive unit 1120 converts the DC power output from the DC-DC converter 1110 into AC power and provides the AC power to the resonant circuit 1130.

The drive unit 1120 may include a switch 1121, first and second inverters 1122 and 1123, and an AC signal controller 1124.

The control communication unit 1150 may control the DC power output from the DC-DC converter 1110 to be applied the first inverter 1122 or the second inverter 1123 through the control of the switch 1121.

In one example, the control communication unit 1150 may determine the intensity of transmission power, determine the inverter type to use for generating an AC signal based on the determined transmission power, and control the switch 1121 according to the determined inverter type. Here, the intensity of the transmission power may be determined based on a feedback signal received from the wireless power transmission device. As an example, the feedback signal may include a control error packet defined in the WPC standard.

In one embodiment, the first inverter 1122 may be a half-bridge type inverter, and the second inverter 1223 may be a full-bridge type inverter. However, embodiments are not limited thereto.

When the intensity of the transmission power determined based on the feedback signal with the first inverter 1122 of the half-bridge type activated exceeds a predetermined threshold value, the control communication unit 1150 may control the switch 1121 to transmit the DC power output from the DC-DC converter 1110 to the second inverter 1122 of the full-bridge type. In this operation, the DC power output from the DC-DC converter 1110 may be controlled so as not to be applied to the first inverter 1122.

The control communication unit 1150 may determine whether it is necessary to change the power control mode according to the intensity of the transmission power determined with one of the first and second inverters 1122 and 1123 activated. When it is determined that the power control mode needs to be changed, the control communication unit 1150 may dynamically change the power control mode by controlling the AC signal controller 1124. For example, the power control mode may include, but is not limited to, a duty cycle control mode, a driving frequency control mode, and a phase shift control mode.

For example, when the first inverter 1122 of the half-bridge type is activated, the control communication unit 1150 may select either the duty cycle control mode or the driving frequency control mode according to the determined intensity of transmission power to perform power control. On the other hand, when the second inverter 1123 of the full-bridge type is activated, the control communication unit 1150 may select either the phase shift control mode or the driving frequency control mode according to the determined intensity of transmission power to perform power control.

In another example, when the first inverter 1122 of the half-bridge type is activated, the control communication unit 1150 may select either the phase shift control mode or the driving frequency control mode according to the determined intensity of transmission power to perform power control. On the other hand, when the second inverter 1123 of the full-bridge type is activated, the control communication unit 1150 may select either the duty cycle control mode or the driving frequency control mode according to the determined intensity of transmission power to perform power control.

When power control is being performed in the duty cycle control mode or the phase shift control mode, the control communication unit 1150 may control the AC signal controller 1124 such that the driving frequency is not changed.

When the duty cycle corresponding to the intensity of the transmission power determined according to the feedback signal exceeds a predetermined duty cycle upper limit during power control in the duty cycle control mode, the control communication unit 1150 may control the AC signal controller 1124 to change the power control mode from the duty cycle control mode to the driving frequency control mode.

When the driving frequency corresponding to the intensity of the transmission power determined according to the feedback signal exceeds a predetermined driving frequency upper limit during power control in the driving frequency control mode with the first inverter 1122 of the half-bridge type activated, the control communication unit 1150 may control the AC signal controller 1124 to activate the second inverter 1123 of the full-bridge type and inactivate the first inverter 1122 of the half-bridge type.

The duty cycle control mode is a wireless power control mode in which the average transmission power during a unit time is controlled by controlling the duty rate of the AC power signal with the driving frequency fixed. Here, the duty rate may have a control range of 10% to 50%, but is not limited thereto.

The driving frequency control mode is a wireless power control mode in which the intensity of the power transmitted through the resonant circuit 1130 is adjusted by adjusting the operating frequency. The intensity of power transmitted through the resonant circuit 1130 may be adjusted according to the degree of matching between the resonance frequency determined by the capacitance of the capacitor and the inductance of the inductor constituting the resonant circuit 1130 and the operating frequency generated by the AC signal controller 1124. For example, when the resonance frequency determined by the resonant circuit 1130 coincides with the operating frequency generated by the AC signal controller 1124, the maximum power may be transmitted. For example, the control range of the operating frequency may be from 110 kHz to 205 kHz, and 110 kHz may be the resonance frequency at which the maximum intensity of transmission power is obtained.

The phase shift control mode is a wireless power control mode in which the intensity of transmission power is controlled by adjusting the phase of an AC signal having a specific operating frequency. In one example, the phase adjustment range may be between 0 degrees and 133 degrees.

The resonant circuit 1130 may include at least one capacitor and at least one inductor configured to form a specific resonance frequency and have a specific impedance value.

When a plurality of transmission coils is included in the resonant circuit 1130, the resonant circuit 1130 may be configured such that the transmission coils have the same impedance value irrespective of the arrangement of the transmission coils.

The control communication unit 1150 may demodulate an in-band signal received from a wireless power receiver. For example, the control communication unit 1150 may demodulate a control error packet received at intervals of a predetermined period after entering the power transfer phase 440 or 560, and may determine the intensity of the transmission power based on the demodulated control error packet.

The control communication unit 1150 may modulate a packet to be transmitted to the wireless power receiver and transmit the same to the resonant circuit 1130. In an example, when an FOD state packet is received in the negotiation phase 540, the control communication unit 1150 may generate a predetermined response packet indicating whether to perform the FO detection procedure based on the quality factor value, modulate the response packet, and transmit the modulated response packet to the resonant circuit 1130.

Here, when the response packet is an ACK packet, this may mean that the wireless power transmission device performs the FO detection procedure based on the quality factor value. On the other hand, when the response packet is a NACK packet, this may mean that the wireless power transmission device does not perform the FO detection procedure based on the quality factor value. The wireless power transmission device may determine whether or not FO detection based on the quality factor value thereof is possible, based on the installed software version and the installed hardware version.

The sensing unit 1140 may measure voltage, current, power, temperature, and the like at a specific node, a specific component, or a specific position of the wireless power transmission device. For example, the sensing unit 1140 may measure the current/voltage/power between the DC-DC converter 1110 and the drive unit 1120 and transmit the measurement result to the control communication unit 1150. In another example, the sensing unit 1140 may measure the intensity of current flowing through the inductor of the resonant circuit 1130 and the magnitude of the voltage applied to the capacitor and transmit the measurement result to the control communication unit 1140.

Figure 12:
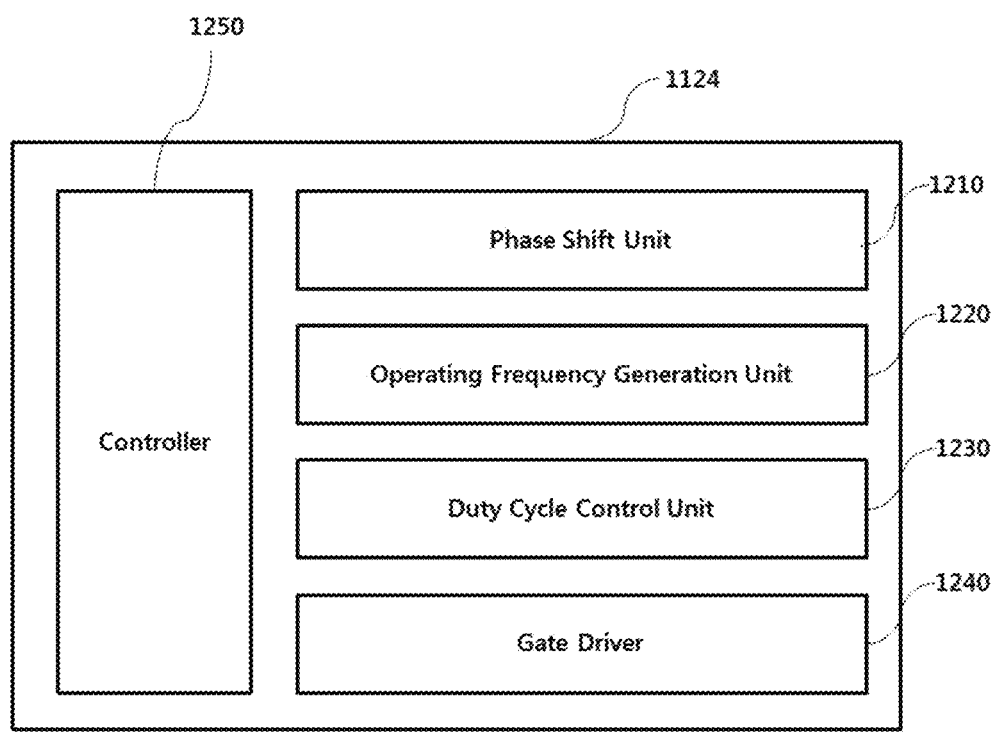
FIG. 12 is a block diagram illustrating the detailed structure of an AC signal controller 1122 of FIG. 11.

FIG. 12 is a block diagram illustrating the detailed structure of the AC signal controller 1122 of FIG. 11.

Referring to FIG. 12, the AC signal controller 1122 may include a phase shift unit 1210, an operating frequency generation unit 1220, a duty cycle control unit 1230, a gate driver 1240, and a controller 1150.

The controller 1150 may communicate with the control communication unit 1150 and control a sub-module according to a control signal of the control communication unit 1150. Here, the sub-module includes the phase shift unit 1210, the operating frequency generation unit 1220, the duty cycle control unit 1230, and the gate driver 1240.

The phase shift unit 1210 may adjust the phase of an AC signal generated by the operating frequency generation unit 1220. The phase-adjusted AC signal may be transferred to the gate driver 1240. In one example, the phase adjustment range may be between 0 degrees and 133 degrees.

The operating frequency generation unit 1220 may generate an AC signal having a specific operating frequency according to a control signal of the controller 1250. The generated AC signal may be transmitted to one of a phase shift unit 1210, the duty cycle control unit 1230, and the gate driver 1240. For example, the operating frequency range adjustable by the operating frequency generation unit 1220 may be from 110 kHz to 205 kHz, and 110 kHz may be a resonance frequency at which the transmission power is maximized. In this case, when the half-bridge type inverter is activated, the operating frequency adjustment range in the operating frequency control mode may be between 172 kHz and 205 kHz. When the full-bridge type inverter is activated, the operating frequency adjustment range in the operating frequency control mode may be between 110 kHz and 172 kHz. However, embodiments are not limited thereto.

The duty cycle control unit 1230 may adjust the duty rate of the AC signal generated by the operating frequency generation unit 1220. The AC signal having an adjusted duty rate may be transmitted to the gate driver 1240. For example, the adjustment range of the duty rate may be 10% to 50%, but is not limited thereto.

The gate driver 1240 may control a switch provided to the first inverter 1122 or the second inverter 1123 based on the input AC signal.

The AC signal input to the gate driver 1240 may be at least one pulse width modulated signal, but is not limited thereto.

Figure 13:
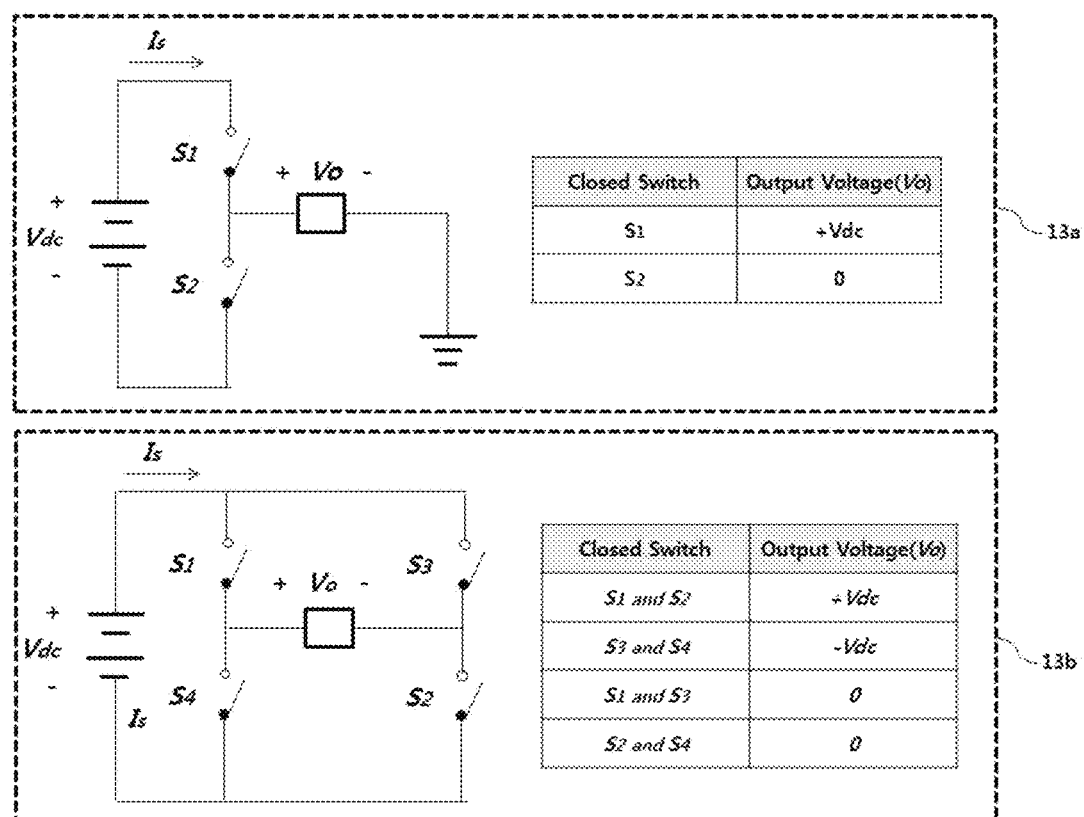
FIG. 13 is a diagram illustrating the basic operation principle of an inverter for converting a DC signal into an AC signal according to an embodiment.

FIG. 13 is a diagram illustrating the basic operation principle of an inverter for converting a DC signal into an AC signal according to an embodiment.

The drive unit 1120 of FIG. 11 may include a half-bridge type inverter and a full-bridge type inverter.

Referring to the section indicated by reference numeral 13a, the half-bridge inverter may include two switches S1 and S2, and the output voltage Vo may be changed according to the switch ON/OFF control of the gate driver. For example, when switch S1 is closed and switch S2 is open, the output voltage Vo has a value of +Vdc, which is the input voltage. On the other hand, when switch S1 is open and switch S2 is closed, the output voltage Vo becomes zero. The half-bridge inverter 13a may output an AC waveform having a periodicity when switches S1 and S2 are alternately closed at predetermined corresponding intervals.

Referring to the section indicated by reference numeral 13b in FIG. 13, the full-bridge inverter may include four switches S1, S2, S3, and S4, and the level of output voltage Vo may have a value of +Vdc, −Vdc or 0 according to the switch ON/OFF control of the gate driver, as shown in the table included in the section indicated by reference numeral 13b. For example, when switches S1 and S2 are closed and the remaining switches are open, the level of output voltage Vo becomes +Vdc. On the other hand, when switches S3 and S4 are closed and the remaining switches are open, the level of output voltage Vo becomes −Vdc.

Figure 14:
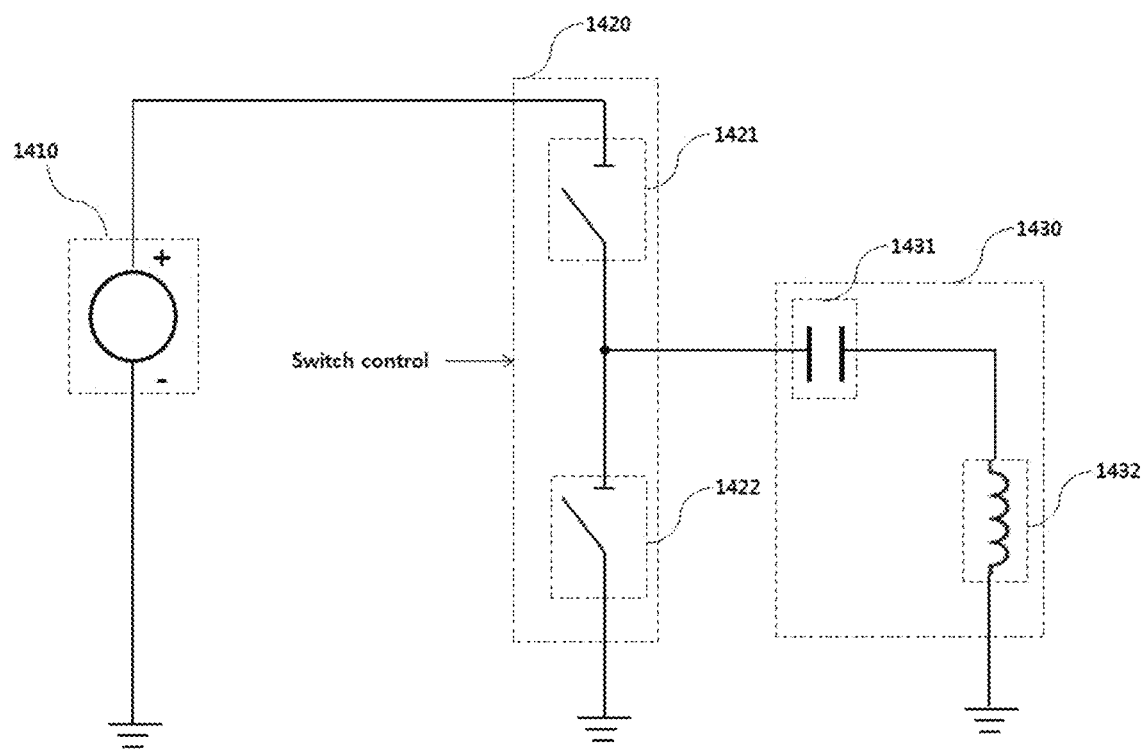
FIG. 14 is an equivalent circuit diagram of a wireless power transmission device equipped with a half-bridge type inverter according to an embodiment.

FIG. 14 is an equivalent circuit diagram of a wireless power transmission device equipped with a half-bridge type inverter according to an embodiment.

For convenience of explanation, the terms "half-bridge type inverter" and "first inverter" will be used interchangeably.

Referring to FIG. 14, the first inverter 1420 may include a first switch 1421 and a second switch 1422. The first inverter 1420 is connected to a resonant circuit 1430 composed of a capacitor 1431 and an inductor 1432. The DC power supplied from a power source 1410 may be converted into an AC signal through switch control of the first inverter 1420 and transmitted to the resonant circuit 1430.

In the embodiment of FIG. 14, a wireless power transmission device having the resonant circuit 1430 including one capacitor 1431 and one inductor 1432 has been described, but this is merely an example. It should be noted that the number of capacitors and inductors constituting the resonant circuit 1430, and the circuit configurations thereof may vary depending on the design purpose of a person skilled in the art.

Figure 15:
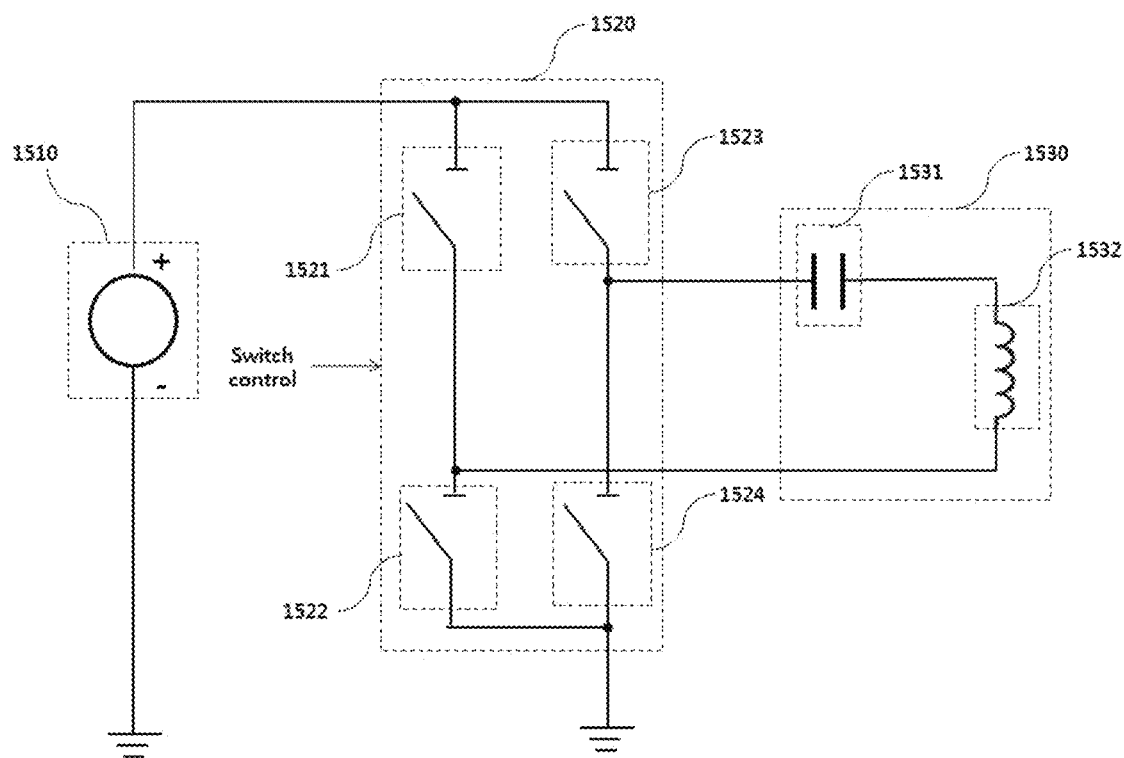
FIG. 15 is an equivalent circuit diagram of a wireless power transmission device equipped with a full-bridge type inverter according to an embodiment.

FIG. 15 is an equivalent circuit diagram of a wireless power transmission device equipped with a full-bridge type inverter according to an embodiment.

For convenience of explanation, the terms "full-bridge type inverter" and "second inverter" will be used interchangeably.

Referring to FIG. 15, the second inverter 1520 may include first to fourth switches 1521, 1522, 1523, and 1524. The second inverter 1520 is connected to a resonant circuit 1530 composed of a capacitor 1531 and an inductor 1532. The DC power supplied from a power source 1510 may be converted into an AC signal through switch control of the second inverter 1520 and transmitted to the resonant circuit 1530.

In the embodiment of FIG. 15, a wireless power transmission device having the resonant circuit 1530 including one capacitor 1531 and one inductor 1532 has been described, but this is merely an example. It should be noted that the number of capacitors and inductors constituting the resonant circuit 1530, and the circuit configurations thereof may vary depending on the design purpose of a person skilled in the art.

Figure 16:
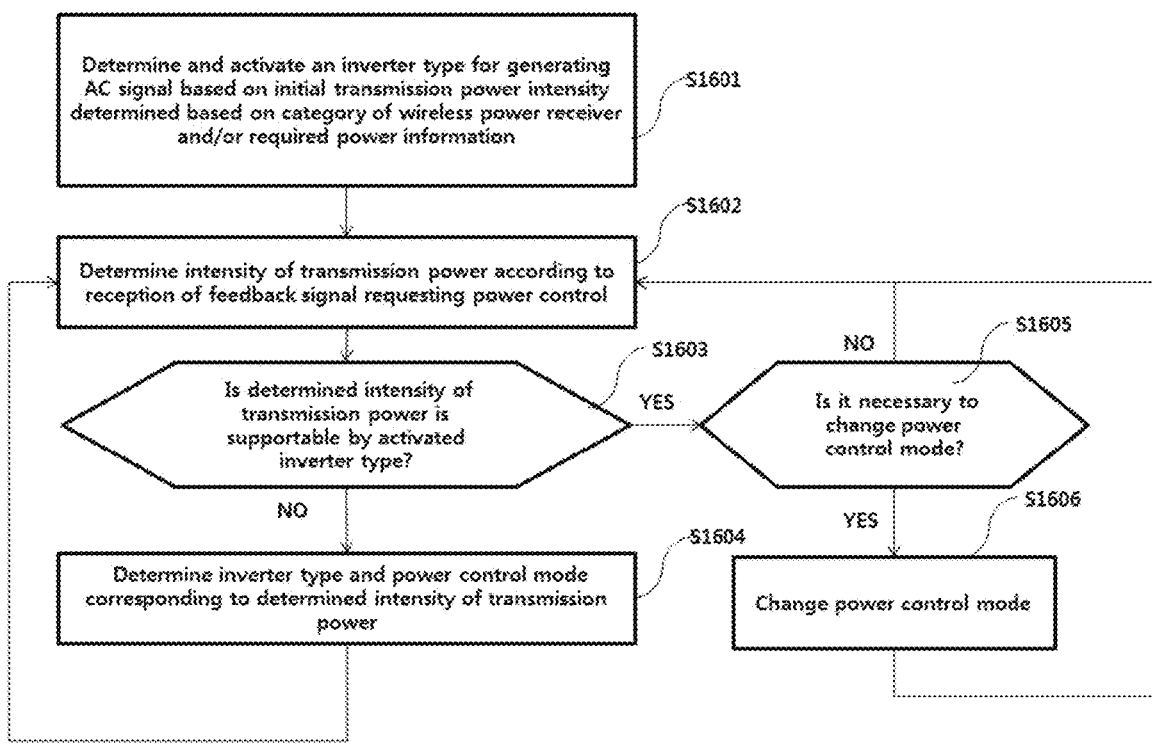
FIG. 16 is a flowchart illustrating a wireless power control method for wireless charging according to an embodiment.

FIG. 16 is a flowchart illustrating a wireless power control method for wireless charging according to an embodiment.

Referring to FIG. 16, a wireless power transmission device may determine an inverter type for generating an AC signal based on an initial transmission power intensity determined based on a category of a wireless power receiver and/or required power information received on a feedback channel, and activate a corresponding inverter (S1601). Here, the feedback channel may be an in-band communication channel that uses the same frequency band as the frequency band used for wireless power transmission, but is not limited thereto. The feedback channel may be a short-range communication channel using a frequency band different from the frequency band used for wireless power transmission.

When a predetermined feedback signal requesting power control is received on the feedback channel, the wireless power transmission device may determine the intensity of the transmission power based on the received feedback signal (S1602).

The wireless power transmission device may determine whether the determined intensity of the transmission power is supportable by the currently activated inverter type (S1603).

When the intensity is not supportable as a result of the determination, the wireless power transmission device may newly determine an inverter type and a power control mode corresponding to the determined intensity of the transmission power (S1604). Then, the wireless power transmission device may generate an AC signal using the newly determined inverter type, and may control the intensity of the transmission power according to the newly determined power control mode and a feedback signal.

When the intensity is supportable as a result of the determination in operation 1603, the wireless power transmission device may determine whether it is necessary to change the power control mode (1605). Here, the wireless power transmission device may determine whether it is necessary to change the power control mode by checking whether the intensity of the transmission power determined in operation 1602 is adjustable through the currently active power control mode.

When the change is necessary as a result of the determination, the wireless power transmission device may newly determine a power control mode corresponding to the determined intensity of transmission power, and perform power control by changing the currently active power control mode to a newly determined power control mode (S1606).

When the change is not necessary as a result of the determination in operation 1605, the wireless power transmission device may return to operation 1602 described above.

Figure 17:
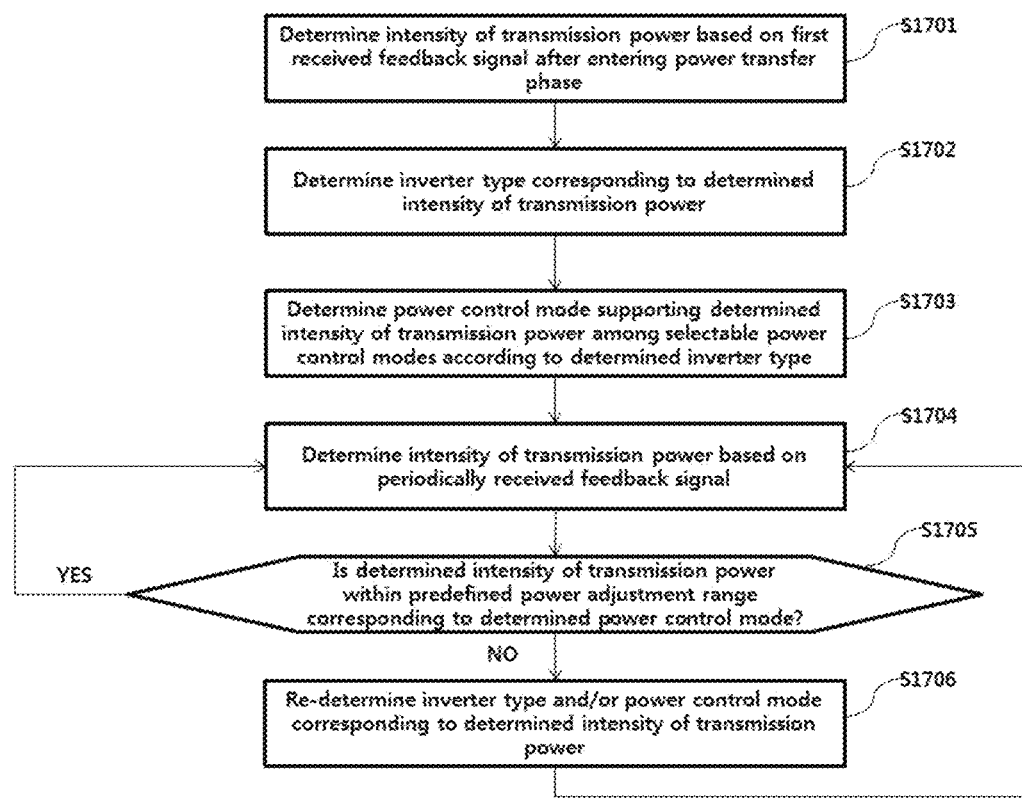
FIG. 17 is a flowchart illustrating a wireless power control method for wireless charging according to another embodiment.

FIG. 17 is a flowchart illustrating a wireless power control method for wireless charging according to another embodiment.

Referring to FIG. 17, the wireless power transmission device may determine the intensity of transmission power based on the first received feedback signal after entering the power transfer phase (S1701).

The wireless power transmission device may determine an inverter type corresponding to the determined intensity of transmission power (S1702).

The wireless power transmission device may determine a power control mode supporting the determined intensity of transmission power among the selectable power control modes according to the determined inverter type (S1703).

Thereafter, the wireless power transmission device may determine the intensity of transmission power based on a periodically received feedback signal (S1704).

The wireless power transmission device may determine whether the intensity of transmission power determined in operation 1704 is within a predefined power adjustment range corresponding to the determined power control mode (S1705).

When the intensity is outside the power adjustment range as a result of the determination, the wireless power transmission device may re-determine an inverter type and/or a power control mode corresponding to the intensity of transmission power determined in operation 1704 (S1706).

When the intensity is within the power adjustment range as a result of the determination in operation 1705, the wireless power transmission device may maintain the currently active inverter type and power control mode and perform operation 1704 described above.

Figure 18:
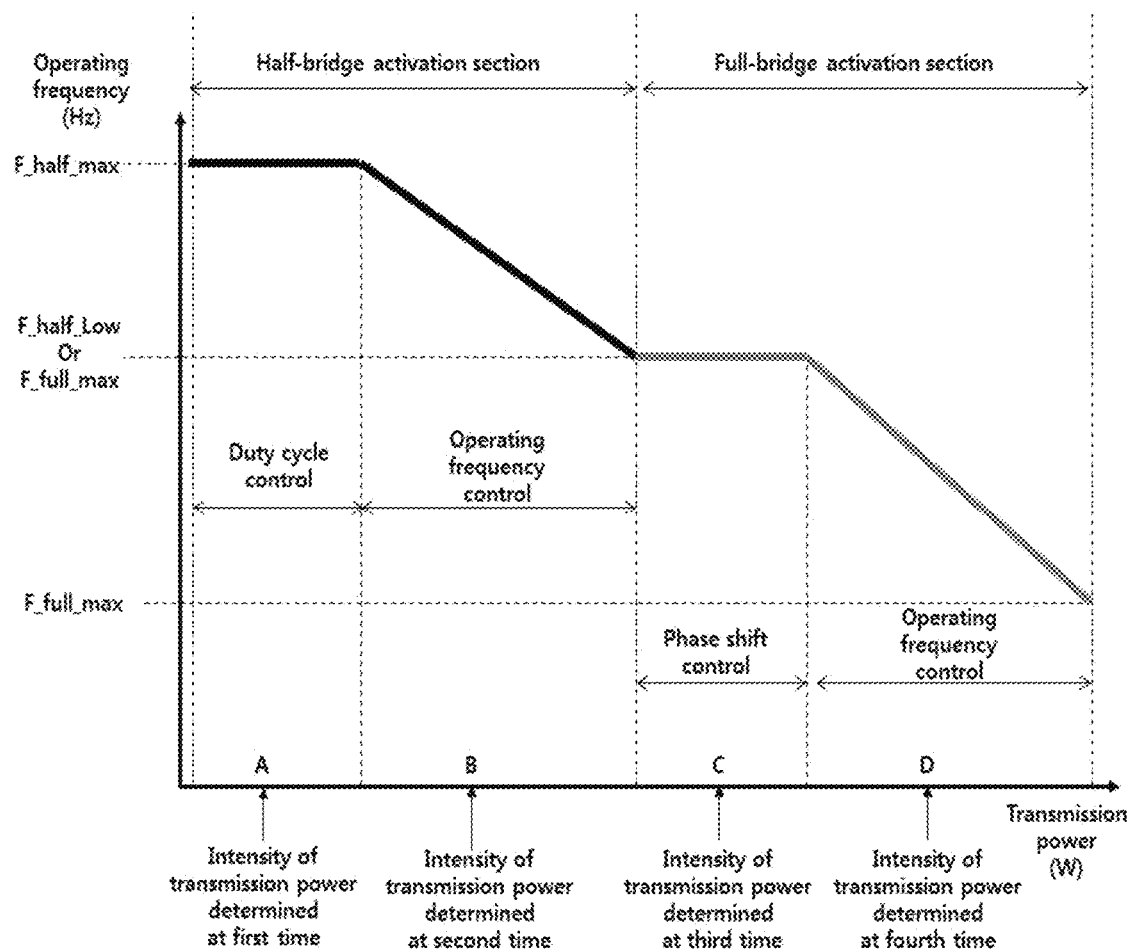
FIG. 18 illustrates a method of switching an inverter type and a power control mode according to change in transmission power intensity according to an embodiment.

FIG. 18 illustrates a method of switching an inverter type and a power control mode according to change in transmission power intensity according to an embodiment.

When a feedback signal requesting power control is received, the wireless power transmission device may determine the intensity of transmission power and determine an inverter type and a power control mode based on the determined transmission power intensity.

Hereinafter, the method of switching the inverter type and the power control mode according to the intensity of transmission power determined based on the feedback signal for a duration from a first time to a fourth time after entering the power transfer phase will be described in detail.

Referring to FIG. 18, when the intensity of transmission power determined by the feedback signal received at the first time is A, the wireless power transmission device may determine the half-bridge as the inverter type and determine the duty cycle control mode as the power control mode.

When the intensity of transmission power determined by the feedback signal received at the second time is B, the inverter type is maintained as the half-bridge, and the power control mode may be switched from the duty cycle control mode to the operating frequency control mode.

When the intensity of transmission power determined by the feedback signal received at the third time is C, the wireless power transmission device may switch the inverter type from half-bridge to full-bridge and determine the phase shift control mode as the power control mode since the inverter type corresponding to the determined transmission power intensity is full-bridge.

When the intensity of transmission power determined by the feedback signal received at the fourth time is D, the wireless power transmission device may maintain the inverter type as full-bridge, and switch the power control mode from the phase shift control mode to the operating frequency control mode.

Figure 19:
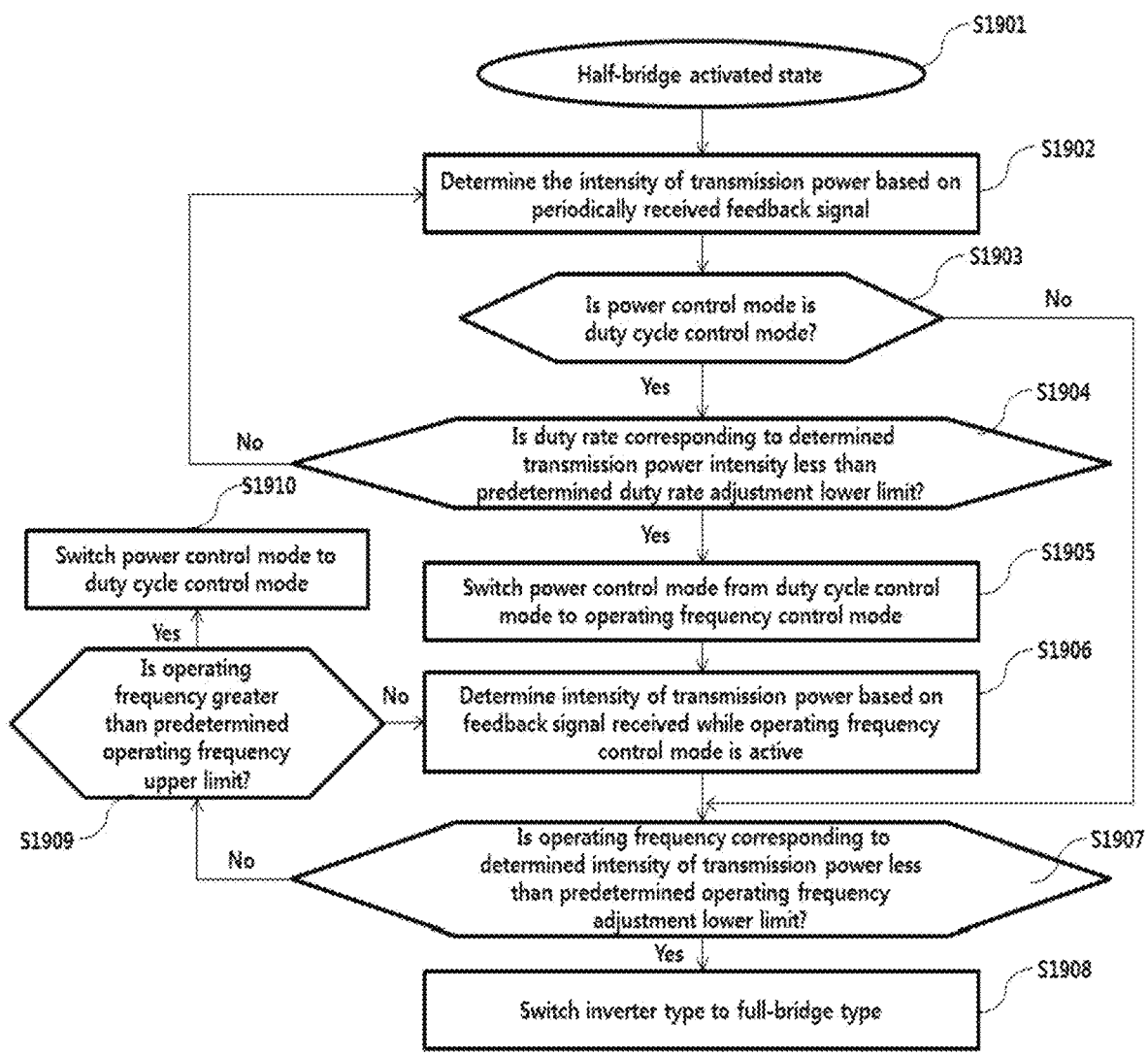
FIG. 19 is a flowchart illustrating a method of controlling wireless power with a half-bridge activated according to an embodiment.

FIG. 19 is a flowchart illustrating a method of controlling wireless power with a half-bridge activated according to an embodiment.

Referring to FIG. 19, the wireless power transmission device may determine the intensity of transmission power based on the feedback signal received while the half-bridge is activated (S1901 to S1902). In an example, the feedback signal may be a control error packet defined in the WPC standard and may be received periodically in the power transfer phase.

The wireless power transmission device may check whether the currently active power control mode is the duty cycle control mode (S1903).

When the currently active power control mode is the duty cycle control mode as a result of the checking, the wireless power transmission device may determine whether the duty rate corresponding to the determined transmission power intensity is less than a predetermined duty rate adjustment lower limit (S1904). In an example, the duty rate adjustment range may be between 10% and 50%. In a case where the duty cycle control mode is active, the lowest power may be transmitted when the duty rate is set to 50%, and the highest power may be transmitted when the duty rate is set to 10%.

When the duty rate corresponding to the intensity of transmission power determined based on the feedback signal while the duty cycle control mode is active is less than a predetermined duty rate lower limit, the wireless power transmission device may switch the power control mode from the duty cycle control mode to the operating frequency control mode (S1905).

The wireless power transmission device may determine the intensity of transmission power based on the feedback signal received while the operating frequency control mode is active (S1906).

The wireless power transmission device may determine whether the operating frequency corresponding to the intensity of transmission power determined in operation 1906 is less than a predetermined operating frequency adjustment lower limit (S1907).

When the operating frequency is less than the predetermined operating frequency adjustment lower limit as a result of the determination, the wireless power transmission device may switch the inverter type to the full-bridge type (S1908).

When the operating frequency corresponding to the determined intensity of transmission power is greater than the predetermined operating frequency adjustment lower limit as a result of the determination in operation 1907, the wireless power transmission device may determine whether the operating frequency corresponding to the determined transmission power intensity is greater than a predetermined operating frequency upper limit (S1909).

When the operating frequency corresponding to the determined transmission power intensity is greater than the operating frequency upper limit as a result of the determination, the wireless power transmission device may switch the power control mode from the operating frequency control mode to the phase shift control mode (S1910).

When the operating frequency is less than the operating frequency upper limit as a result of the determination in operation 1909, the wireless power transmission device may proceed to operation 1906 and perform power control in the operating frequency control mode.

When the currently active power control mode is not the duty cycle control mode as a result of the determination in operation 1903, the wireless power transmission device may perform operation S1907 described above.

Figure 20:
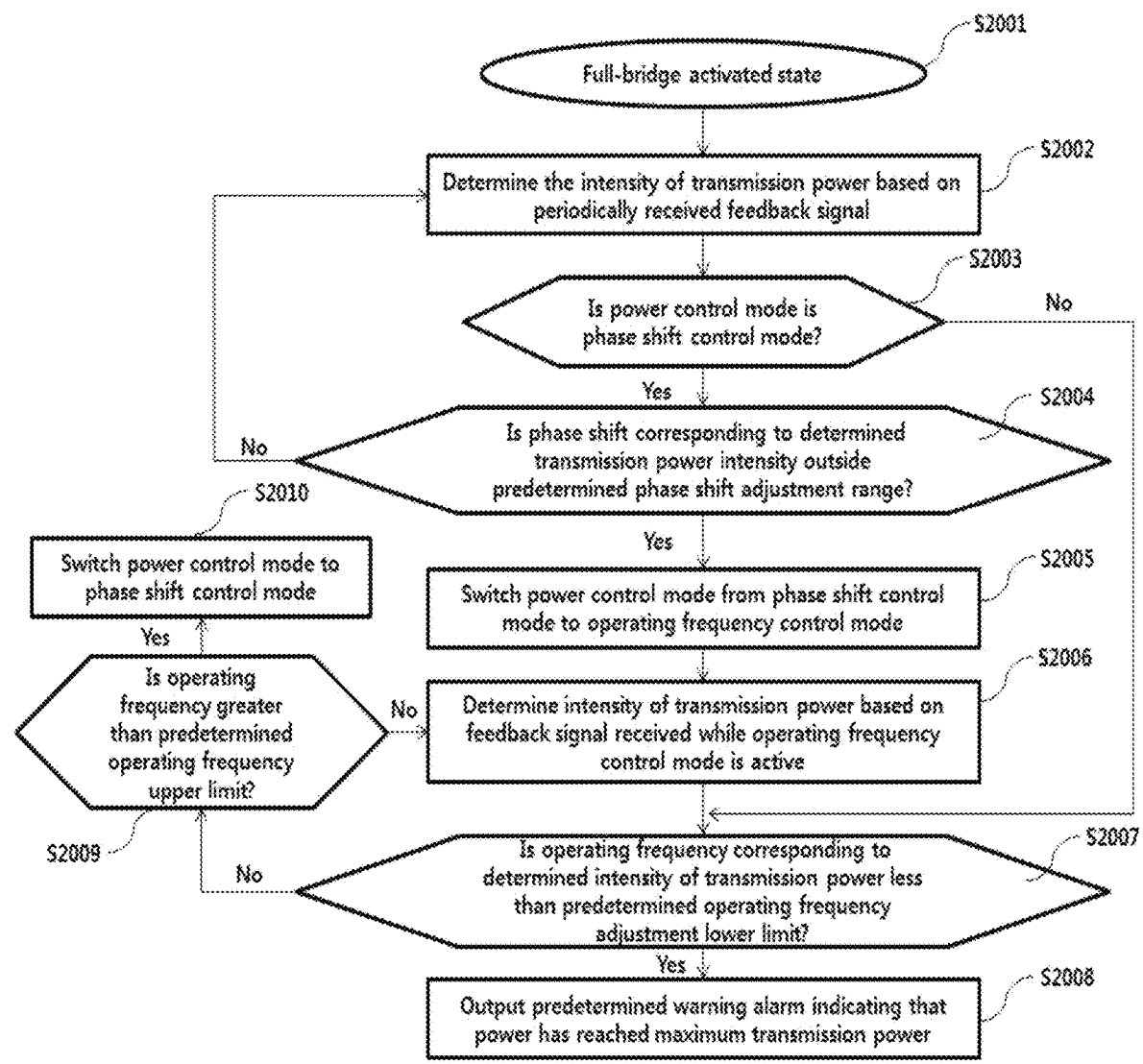
FIG. 20 is a flowchart illustrating a method of controlling wireless power with a full-bridge activated according to an embodiment.

FIG. 20 is a flowchart illustrating a method of controlling wireless power with a full-bridge activated according to an embodiment.

Referring to FIG. 20, the wireless power transmission device may determine the intensity of transmission power based on the feedback signal periodically received with the full-bridge activated (S2001 and S2002).

The wireless power transmission device may check whether the currently active power control mode is the phase shift control mode (S2003).

When the currently active power control mode is the phase shift control mode as a result of the checking, the wireless power transmission device may determine whether the phase shift corresponding to the determined transmission power intensity is outside a predetermined phase shift adjustment range (S2004). For example, the phase adjustment range may be between 0 degrees and 133 degrees. When the phase shift to be adjusted according to the determined transmission power intensity is less than 0 degrees or greater than 133 degrees, the wireless power transmission device may determine that the phase shift is outside the predetermined phase shift adjustment range.

As a result of the determination, when the phase shift is outside the phase shift adjustment range, the wireless power transmission device may switch the power control mode from the phase shift control mode to the operating frequency control mode (S2005).

The wireless power transmission device may determine the intensity of transmission power based on the feedback signal received while the operating frequency control mode is active (S2006).

The wireless power transmission device may determine whether the operating frequency corresponding to the transmission power intensity determined in operation 2006 is less than a predetermined operating frequency adjustment lower limit (S2007).

When the operating frequency is less than the predetermined operating frequency adjustment lower limit as a result of the determination, the wireless power transmission device may output a predetermined warning alarm signal indicating that the power has reached the maximum transmission power (S2008). Here, the warning alarm signal may be output using an alarm and/or a display means such as a lamp, a buzzer, vibration, or a liquid crystal display, but embodiments are not limited thereto.

When the operating frequency corresponding to the determined transmission power is greater than the predetermined operating frequency lower limit as a result of the determination in operation 2007, the wireless power transmission device may determine whether the operating frequency corresponding to the determined transmission power is greater than a predetermined operating frequency upper limit (S2009).

When the operating frequency is less than the operating frequency upper limit as a result of the determination, the wireless power transmission device may return to operation 2006.

On the other hand, when the operating frequency corresponding to the determined transmission power intensity is greater than the operating frequency upper limit as a result of the determination in operation 2009, the wireless power transmission device may switch the power control mode from the operating frequency control mode to the phase shift control mode (S2010).

When the currently active power control mode is not the phase shift control mode as a result of the checking in operation 2003, the wireless power transmission device may perform operation 2007 described above.

Figure 21:
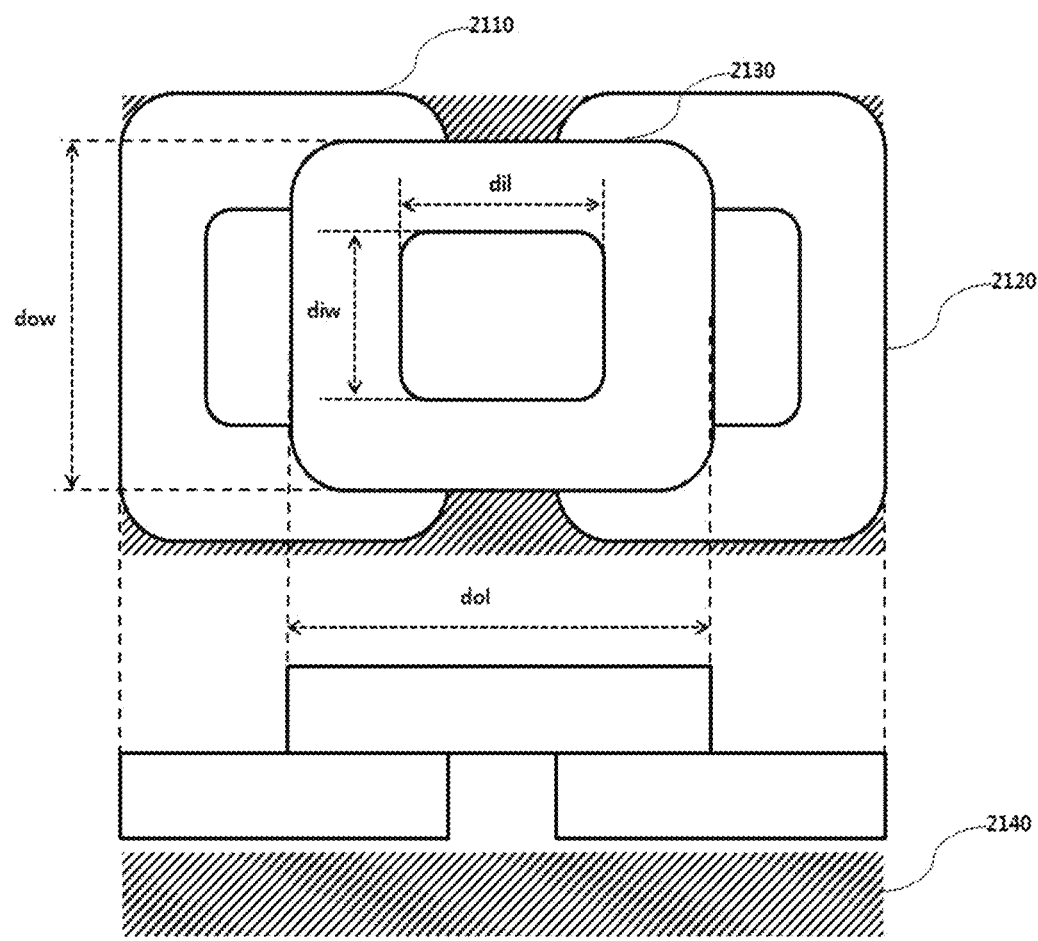
FIG. 21 is a diagram illustrating a wireless charging transmission coil according to an embodiment.

FIG. 21 is a diagram illustrating a wireless charging transmission coil according to an embodiment.

Referring to FIG. 21, three wireless charging transmission coils may be configured. At least one of the plurality of transmission coils may be disposed in a partially overlapping manner in order to perform uniform power transmission within a charging area of a constant size. In FIG. 21, the first coil 2110 and the second coil 2120 may be disposed side by side at a predetermined distance from each other in a first layer over a shielding member 2140, and the third coil 2130 may be disposed in a second layer on the first coil and the second coil so as to partially overlap the first coil and the second coil.

The first coil 2110, the second coil 2120 and the third coil 2130 may be manufactured according to the coil specifications defined by WPC or PMA and may have the same physical properties within an allowable range.

For example, the transmission coils may have the specifications shown in Table 1 below.

TABLE 1

| Parameter | Symbol | Value |
| --- | --- | --- |
| Outer length | dol | 53.2 ± 0.5 mm |
| Inner length | dil | 27.5 ± 0.5 mm |
| Outer width | dow | 45.2 ± 0.5 mm |
| Inner width | diw | 19.5 ± 0.5 mm |
| Thickness | dc | 1.5 ± 0.5 mm |
| Number of turns per layer | N | 12 turns |
| Number of layers | | 1 |

Table 1 shows specifications of a coil of Type A13 defined in WPC. In one embodiment, the first coil 2110, the second coil 2120 and the third coil 2130 may be manufactured to have the outer length, inner length, outer width, inner width, thickness, and number of turns per layer defined in Table 1. Of course, the first coil 2110, the second coil 2120, and the third coil 2130 may have the same physical properties within a tolerance range by the same manufacturing process.

As shown in FIG. 12, the first coil 2110, the second coil 2120, and the third coil 2130 may have different measured inductances, depending on positions where the coils are disposed in relation to the shielding member 2140.

The first coil 2110 and the second coil 2120 satisfy the specifications of Table 1 and have an inductance of 12.5 pH. The third coil 2130 is spaced apart from the shielding member 2140 by a distance different from the distance from the first coil 2110 and the second coil 2120 to the shielding member and thus may have an inductance less than 12.5 pH.

For example, the first coil 2110 and the second coil 2120 may be disposed in contact with the shielding material 2140, but the third coil 2130 may be disposed apart from the shielding material 2140 by a predetermined height.

In one embodiment, an adhesive member may be disposed between the first coil 2110, the second coil 2120, or the third coil 2130 and the shielding member 2140.

Accordingly, in one embodiment of the present disclosure, the third coil 2130 is configured to have turns, the number of which is greater than the number of turns of the first coil 2110 and the second coil 2120 by several turns (for example, 0.5 turns or one or two turns) such that the third coil 2130 has the same inductance as the first coil 2110 and the second coil 2120.

In one embodiment, the third coil 2130 may have 12.5, 13 or 14 turns.

In other words, since the third coil 2130 located at the center is disposed at a longer distance from the shielding member 2140 than the first coil 2110 and the second coil 2120, the measured inductance thereof may be less than that of the first coil 2110 and the second coil 2120.

In order to make all the transmission coils have the same inductance, the length of the conductive wire constituting the third coil 2130 may be made slightly longer than that of the first coil 2110 and the second coil 2120 such that the coils have the same inductance.

In one embodiment, the conductive wire constituting the third coil 2130 may be made longer than the first coil 2110 and the second coil 2120 by a predetermined length. Thus, although the third coil 2130 is located farther from the shielding member 2140 than the first coil 2130 and the second coil 2120, the three coils may have the same inductance of 12.5 pH. In one embodiment, the same inductance of the coils may mean having a tolerance range of ±0.5 pH.

For the transmission coils 2110 to 2130 disposed to partially overlap each other, as the distance from the shielding material 2140 increases, the inductance measured according to the corresponding transmission coil decreases. Therefore, in order to maintain the inductance corresponding to the third coil 2130, which has a longer distance from the shielding member 2140 than the first coil 2110 and the second coil 2120 so as to be equal to the inductance corresponding to the first coil 2110 and the second coil 2120, the conductive wire of the third coil 2130 may be configured to be longer than the conductive wires of the first coil 2110 and the second coil 2120.

In one embodiment, when the third coil 2130 is configured to have more turns than the first coil 2130 and the second coil 2120, the third coil may have the same inner length, the same inner width, and the same thickness as the first coil and the second coil, but may have a different outer length and a different outer width from the first coil and the second coil.

In one embodiment, when the third coil 2130 is configured to have more turns than the first coil 2130 and the second coil 2120, the third coil may have the same outer length, the same outer width, and the same inner width and the same thickness as the first coil and the second coil, but may have a different inner length from the first coil and the second coil.

In one embodiment, when the third coil 2130 is configured to have more turns than the first coil 2130 and the second coil 2120, the third coil may have the same outer length, the same outer width, and the same inner length and the same thickness as the first coil and the second coil, but may have a different inner width from the first coil and the second coil.

In one embodiment, when the third coil 2130 is configured to have more turns than the first coil 2130 and the second coil 2120, the third coil may have the same outer width, and the same inner length and the same inner width and the same thickness as the first coil and the second coil, but may have a different outer length from the first coil and the second coil.

In one embodiment, when the third coil 2130 is configured to have more turns than the first coil 2130 and the second coil 2120, the third coil may have the same outer length, the same inner length, the same inner width and the same thickness as the first coil and the second coil, but may have a different outer width from the first coil and the second coil.

In other words, the third coil 2130 located at the center is positioned farther away from the shielding member than the first coil 2110 and the second coil 2120 and the measured inductance thereof may be different from the inductance of the first coil 2110 and the second coil 2120. Accordingly, by making the conductive wire constituting the third coil 2130 a little longer than the first coil 2110 and the second coil 2120, the inductance of the third coil may be adjusted to be equal to that of the first coil and the second coil.

For transmission coils positioned overlapping each other, as the distance from the transmission coils to the shielding material increases, the measured inductance of the transmission coils may decrease. As the distance to the shielding material increases, the length of the transmission coil may be increased to increase the inductance.

When the inductances of the first coil 2110, the second coil 2120, and the third coil 2130 are different from each other, resonant circuits including capacitors different from each other according to the inductances and drive circuits to control the resonance frequencies generated in the resonant circuits may be needed.

Figure 22:
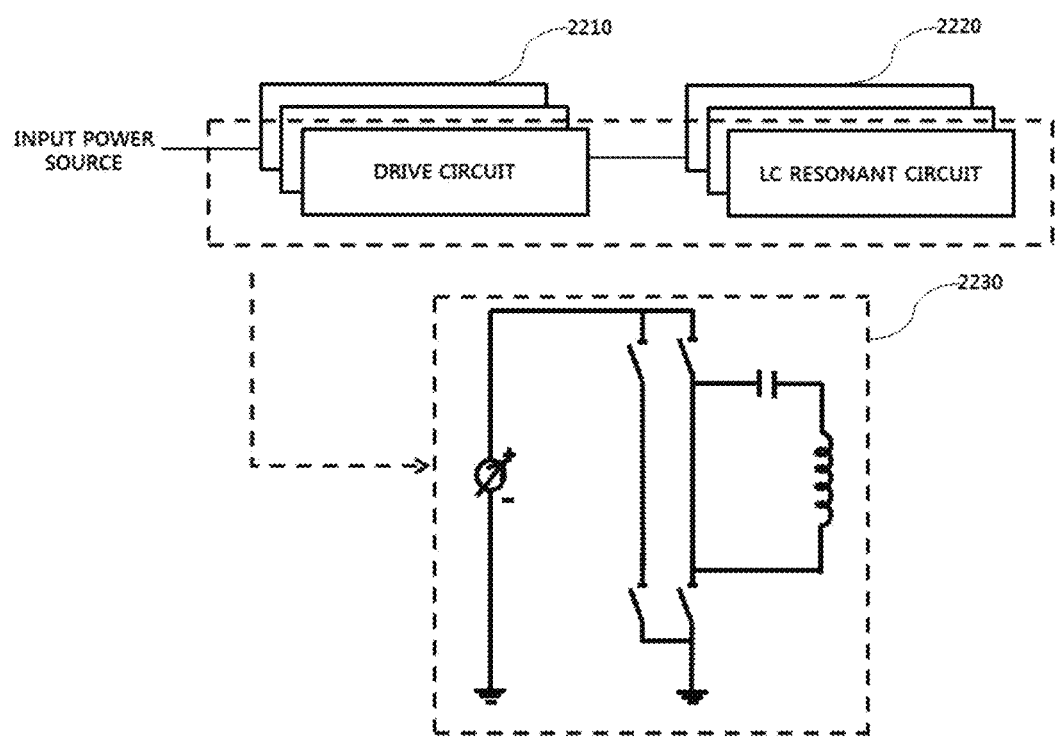
FIG. 22 is a diagram illustrating three drive circuits including a full-bridge inverter in a wireless power transmitter including a plurality of coils according to an embodiment.

FIG. 22 is a diagram illustrating three drive circuits including a full-bridge inverter in a wireless power transmitter including a plurality of coils according to an embodiment.

Referring to FIG. 22, when the three transmission coils included in the wireless power transmitter have different inductances, three drive circuits 2210 connected to the respective transmission coils and three LC resonant circuits 2220 including capacitors for generating the same resonance frequency are required.

Although the wireless power transmitter includes a plurality of transmission coils, the resonance frequency that the wireless power transmitter generates to perform power transmission should not depend on each of the transmission coils, and should conform to a standard resonance frequency supported by the wireless power transmitter.

A resonance frequency generated by the LC resonant circuit 2220 may depend on the inductance of the coil and the capacitance of the capacitor.

For example, the resonance frequency fr may be 100 kHz. When the capacitance of a capacitor connected to a transmission coil to generate the resonance frequency is 200 nF, all three transmission coils should meet 12.5 pH to use only one capacitor. When the inductances of the three transmission coils are different from each other, three capacitors having different capacitances corresponding to the inductances are required to generate the resonance frequency of 100 kHz. In addition, three drive circuits 2210 including an inverter for applying an AC voltage in each LC resonant circuit 2220 are also required.

Figure 23:
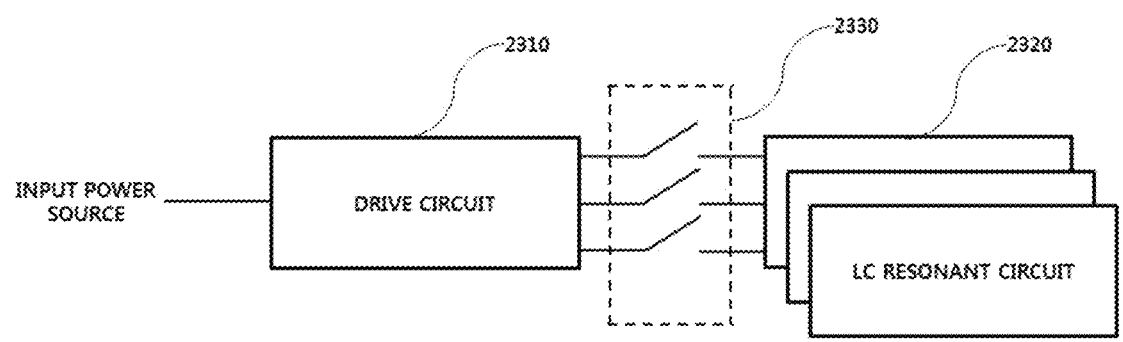
FIG. 23 is a diagram illustrating a wireless power transmitter including a plurality of coils and one drive circuit according to an embodiment.

FIG. 23 is a diagram illustrating a wireless power transmitter including a plurality of coils and one drive circuit according to an embodiment.

Referring to FIG. 23, when the three transmission coils have the same inductance, the wireless power transmitter may include only one drive circuit 2310, and may control the switch 2330 to connect the drive circuit 2310 to a transmission coil having the highest power transmission efficiency with respect to the reception coil among the three transmission coils.

Compared to FIG. 22, the wireless power transmitter may reduce the area occupied by the components by using only one drive circuit 2310, thereby allowing a compact design of the wireless power transmitter and reducing the cost of raw materials required for manufacture.

In one embodiment, the wireless power transmitter may use a signal strength indicator in the ping phase to calculate the power transmission efficiency between the three transmission coils and the reception coil.

In another embodiment, the wireless power transmitter may calculate the coupling coefficients between the transmission coils and the reception coil to select a transmission coil having a high coupling coefficient.

In another embodiment, the wireless power transmitter may calculate a Q factor to identify a transmission coil having a high Q factor and control the switch 2330 to connect the identified transmission coil to the drive circuit 2310.

Figure 24:
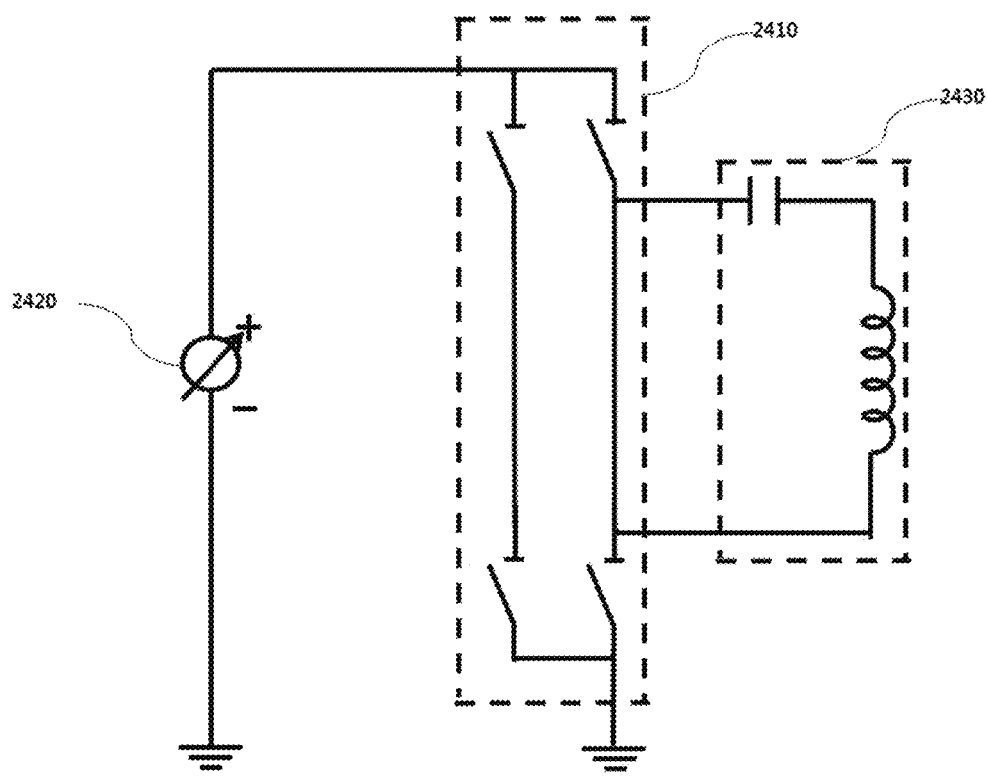
FIG. 24 is a diagram illustrating a drive circuit including a full-bridge inverter according to an embodiment.

FIG. 24 is a diagram illustrating a drive circuit including a full-bridge inverter according to an embodiment.

Referring to FIG. 24, a power transmission unit included in the wireless power transmitter may generate a specific operating frequency for power transmission. The power transmission unit may include an inverter 2410, an input power source 2420, and an LC resonant circuit 2430.

The inverter 2410 may convert a voltage signal from the input power source and transmit the converted signal to the LC resonant circuit 2430. In one embodiment, the inverter 2410 may be a full-bridge inverter or a half-bridge inverter.

The power transmission unit may use a full-bridge inverter for higher output than the output by a half-bridge inverter. The full-bridge inverter may be configured by adding two switches to the half-bridge inverter and may thus use four switches to output a voltage twice as high as that of the half-bridge inverter and apply the output voltage to the LC resonant circuit 2430.

Figure 25:
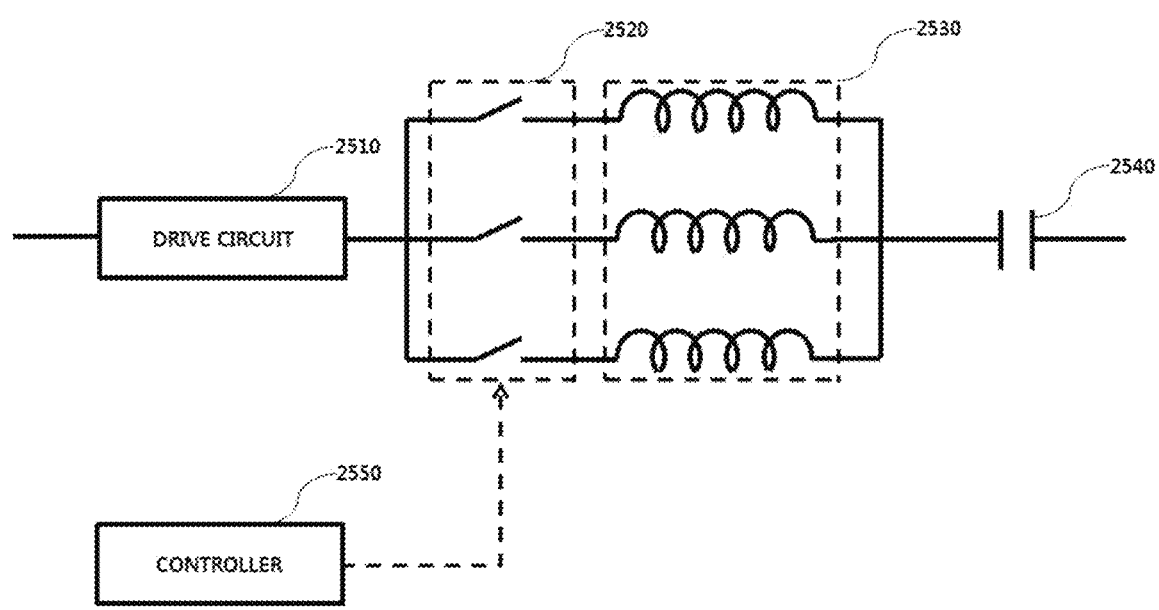
FIG. 25 is a diagram illustrating a structure of a wireless power transmission device including the wireless charging transmission coils of FIG. 21 according to an embodiment.

FIG. 25 is a diagram illustrating a structure of a wireless power transmission device including the wireless charging transmission coils of FIG. 21 according to an embodiment.

Referring to FIG. 25, the wireless power transmission device may include a drive circuit 2510 configured to convert an input voltage, a switch 2520 configured to connect the drive circuit 2510 and an LC resonant circuit, a plurality of transmission coils 2530, one capacitor 2540 connected in series with the plurality of transmission coils, and a controller 2550 configured to control opening and closing of the switch 2520.

The controller 2550 may identify a transmission coil having the highest power transmission efficiency with respect to a reception coil among the plurality of transmission coils 2530 and control the switch to be closed so as to connect the identified transmission coil with the drive circuit 2510.

Referring to FIG. 25, when the inductors of the three transmission coils have the same inductance, the wireless power transmission device may include only one drive circuit 2510, and control the switch 2520 to connect one drive circuit 2510 to a transmission coil having the highest power transmission efficiency or coupling coefficient with respect to the reception coil.

Compared to the conventional technology providing drive circuits as many as the transmission coils, the wireless power transmission device according to the present disclosure only needs to have one drive circuit 2510. Therefore, the present disclosure may minimize the area occupied by the components, thereby allowing a compact design of the wireless power transmitter and reducing costs.

A wireless charging transmission coil according to one embodiment may be designed to minimize heat generation in a 15 W class wireless charging device, and the capacitor 2540 in FIG. 25 may have a capacitance range of 200 nF±5%.

In addition, the three transmission coils 2530 shown in FIG. 25 may have an inductance, that is, a self-induction coefficient with respect to the shielding material, in the same range of 12.5 uH±10%. In an embodiment, the difference in the self-induction between the three transmission coils 2530 may be designed to be within a range of 1 uH±20%. In this case, the AC voltage applied to an inverter constituting the drive circuit 2510 may be within a range of 12±1 V, and the operating frequency of the inverter may be within a range of 110 kHz to 205 kHz. Here, the inverter may be a full-bridge inverter. Using the coils and the circuit structure described above, the applicant has succeeded in lowering the temperature of heat generated in the wireless charging transmitter to 50° C. from the maximum heat of 70° C. or more in conventional cases.

The methods according to embodiments of the present disclosure may be implemented as a program to be executed on a computer and stored in a computer-readable recording medium. Examples of the computer-readable recording medium include ROM, RAM, CD-ROM, magnetic tapes, floppy disks, and optical data storage devices, and also include carrier-wave type implementation (e.g., transmission over the Internet).

The computer-readable recording medium may be distributed to a computer system connected over a network, and computer-readable code may be stored and executed thereon in a distributed manner. Functional programs, code, and code segments for implementing the method described above may be easily inferred by programmers in the art to which the embodiments pertain.

It is apparent to those skilled in the art that the present disclosure may be embodied in specific forms other than those set forth herein without departing from the spirit and essential characteristics of the present disclosure.

Therefore, the above embodiments should be construed in all aspects as illustrative and not restrictive. The scope of the disclosure should be determined by the appended claims and their legal equivalents, and all changes coming within the meaning and equivalency range of the appended claims are intended to be embraced therein.

INDUSTRIAL APPLICABILITY

A method of controlling a wireless power transmitter according to embodiments may be used in a wireless power transmitter including a plurality of transmission coils.

The invention claimed is:

1. A method of controlling a wireless power transmitter, the method comprising:
 when an object is detected in a charging area, selecting a transmission coil having a highest power transmission efficiency among N transmission coils including at least one transmission coil arranged in an overlapping manner and turns of the at least one transmission coil cross over turns of another coil among the N transmission coils, where N is a whole number; and controlling a corresponding switch among N switches to connect the selected transmission coil with a drive circuit, wherein the N transmission coils have the same inductance, a wire constituting an upper transmission coil among the N transmission coils is longer than a wire constituting a lower transmission coil among the N transmission coils, and the upper transmission coil is located farther away from a shielding member than the lower transmission coil, and wherein the N transmission coils are connected in parallel and one end of each of the N transmission coils is connected with a same capacitor, and the N transmission coils are configured to individually connect to the drive circuit via the N switches.

2. The method according to claim 1, wherein the N transmission coils have the same inductance by forming a different number of turns corresponding to the respective positions with respect to the shielding member.

3. The method according to claim 2, wherein each of the N transmission coils has the different number of turns according to a distance thereof from the shielding member.

4. The method according to claim 2, wherein the number of turns of each of the N transmission coils is proportional to a distance from the shielding member.

5. The method according to claim 2, wherein a difference in the number of turns between the N transmission coils is 0.5 to 2 turns.

6. The method according to claim 1, wherein the N transmission coils transmit power to a reception coil using a specific resonance frequency.

7. The method according to claim 1, wherein the drive circuit comprises an inverter configured to convert a direct current voltage from a power source into an alternating current voltage.

8. The method according to claim 1, wherein the selected transmission coil is connected in series between the drive circuit and the same capacitor when one of the N switches is closed.

9. A wireless power transmitter comprising:

N transmission coils including at least one transmission coil arranged in an overlapping manner and turns of the at least one transmission coil cross over turns of another coil among the N transmission coils, where N is a whole number;

N switches configured to connect the N transmission coils with a drive circuit;

a same capacitor connected to the N transmission coils;

a shielding member; and a controller configured to, when an object is detected in a charging area, select a transmission coil having a highest power transmission efficiency among the N transmission coils and control a corresponding switch among the N switches to connect the selected transmission coil with the drive circuit, wherein the N transmission coils have the same inductance, a wire constituting an upper transmission coil among the N transmission coils is longer than a wire constituting a lower transmission coil among the N transmission coils, and the upper transmission coil is located farther away from the shielding member than the lower transmission coil, and wherein the N transmission coils are connected in parallel and one end of each of the N transmission coils is connected with the same capacitor, and the N transmission coils are configured to individually connect to the drive circuit via the N switches.

10. The wireless power transmitter according to claim 9, wherein the N transmission coils have the same inductance by forming a different number of turns corresponding to the respective positions with respect to the shielding member.

11. The wireless power transmitter according to claim 10, wherein each of the N transmission coils has a different number of turns according to a distance thereof from the shielding member.

12. The wireless power transmitter according to claim 10, wherein the number of turns of each of the N transmission coils is proportional to a distance from the shielding member.

13. The wireless power transmitter according to claim 10, wherein a difference in the number of turns between the N transmission coils is 0.5 to 2 turns.

14. The wireless power transmitter according to claim 9, wherein the N transmission coils transmit power to a reception coil using a specific resonance frequency.

15. The wireless power transmitter according to claim 9, wherein the drive circuit includes an inverter configured to convert a direct current voltage from a power source into an alternating current voltage.

16. The wireless power transmitter according to claim 9, wherein the selected transmission coil is connected in series between the drive circuit and the same capacitor when one of the N switches is closed.

* * * * *